United States Patent
Han et al.

(10) Patent No.: US 11,422,104 B2
(45) Date of Patent: Aug. 23, 2022

(54) EXPOSED WIRE-BONDING FOR SENSING LIQUID AND WATER IN ELECTRONIC DEVICES

(71) Applicant: Apple Inc., Cupertino, CA (US)

(72) Inventors: Caleb C. Han, Santa Clara, CA (US); Brad G. Boozer, Saratoga, CA (US); David MacNeil, Cupertino, CA (US); Gregory B. Arndt, San Jose, CA (US); Patrick E. O'Brien, Pleasanton, CA (US); Roham Solasi, San Francisco, CA (US); Tongbi T. Jiang, Santa Clara, CA (US); Ashwin Balasubramanian, Sunnyvale, CA (US); William S. Lee, Fremont, CA (US); Manoj K. Bhattacharyya, Cupertino, CA (US); Jiahui Liang, Sunnyvale, CA (US); James G. Horiuchi, Fresno, CA (US); Savas Gider, San Jose, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 16/854,688

(22) Filed: Apr. 21, 2020

(65) Prior Publication Data
US 2021/0072176 A1 Mar. 11, 2021

Related U.S. Application Data

(60) Provisional application No. 62/897,125, filed on Sep. 6, 2019.

(51) Int. Cl.
*G01N 27/00* (2006.01)
*G01N 27/22* (2006.01)
*G01N 27/07* (2006.01)
(Continued)

(52) U.S. Cl.
CPC ......... *G01N 27/223* (2013.01); *G01N 27/045* (2013.01); *G01N 27/048* (2013.01);
(Continued)

(58) Field of Classification Search
USPC ......................................... 324/640, 643, 664
See application file for complete search history.

(56) References Cited

U.S. PATENT DOCUMENTS

| 4,909,070 A | 3/1990 | Smith |
| 2004/0108861 A1 | 6/2004 | Germiquet et al. |

(Continued)

FOREIGN PATENT DOCUMENTS

| CN | 1510535 B | 5/2010 |
| CN | 106415287 A | 2/2017 |

(Continued)

OTHER PUBLICATIONS

LPS33W Datasheet, ST, Production Data Datasheet, DOCID032364 Rev 1, Jan. 2019, 52 pp.

*Primary Examiner* — Vincent Q Nguyen
(74) *Attorney, Agent, or Firm* — Dorsey & Whitney LLP

(57) ABSTRACT

An electronic device can include a housing defining an internal volume and a pressure sensor assembly disposed in the internal volume and in communication with an ambient environment. The pressure sensor assembly can include a structure at least partially enclosing a sensor volume, a pressure sensor affixed to a die disposed in the sensor volume, and an exposed moisture detection conductor positioned in the sensor volume.

15 Claims, 16 Drawing Sheets

(51) Int. Cl.
*G04G 21/02* (2010.01)
*G01N 27/04* (2006.01)
*G06F 1/16* (2006.01)

(52) U.S. Cl.
CPC ........... *G01N 27/07* (2013.01); *G01N 27/226* (2013.01); *G01N 27/228* (2013.01); *G04G 21/02* (2013.01); *G06F 1/163* (2013.01)

(56) References Cited

U.S. PATENT DOCUMENTS

| | | |
|---|---|---|
| 2005/0132815 A1 | 6/2005 | Claude et al. |
| 2006/0212193 A1* | 9/2006 | Breed ................. B60C 23/0425 701/33.7 |
| 2013/0182360 A1 | 7/2013 | Stevens et al. |
| 2015/0076630 A1 | 3/2015 | Low et al. |
| 2015/0192535 A1* | 7/2015 | Morgan ................. G01K 13/00 324/693 |
| 2016/0069810 A1* | 3/2016 | Walavalkar .......... A61B 5/1459 356/301 |
| 2017/0067790 A1 | 3/2017 | Takeuchi |
| 2017/0089698 A1 | 3/2017 | Ehman et al. |
| 2017/0284883 A1* | 10/2017 | Yang ........................ G01L 9/08 |
| 2017/0292884 A1 | 10/2017 | Ching et al. |
| 2018/0130333 A1 | 5/2018 | Smith |
| 2019/0165250 A1* | 5/2019 | Sounart ............... H01L 41/1132 |
| 2019/0237963 A1 | 8/2019 | Wuerstlein et al. |

FOREIGN PATENT DOCUMENTS

| | | |
|---|---|---|
| CN | 106500883 A | 3/2017 |
| CN | 107290096 A | 10/2017 |
| CN | 104458101 B | 1/2019 |
| CN | 110097742 B | 10/2021 |
| TW | 200636222 A | 10/2006 |
| WO | 2006086178 A1 | 8/2006 |
| WO | 2015105531 A1 | 7/2015 |

* cited by examiner

EXPOSED WIRE-BONDING FOR SENSING LIQUID AND WATER IN ELECTRONIC DEVICES

CROSS-REFERENCE TO RELATED APPLICATION(S)

This claims priority to U.S. Provisional Patent Application No. 62/897,125, filed 6 Sep. 2019, and entitled "EXPOSED WIRE-BONDING FOR SENSING LIQUID AND WATER IN ELECTRONIC DEVICES," the entire disclosure of which is hereby incorporated by reference.

FIELD

The present disclosure relates generally to electronic devices. More particularly, the present disclosure relates to electronic devices including environmental sensors.

BACKGROUND

Electronic devices can include a variety of features and components to enhance the user experience. For example, an electronic device can include one or more sensing components designed to monitor the user or the ambient environment around the device. In particular, a wearable electronic device can include sensors used to provide a user with environmental information, such as geographic location and altitude.

For a number of applications, it is desirable to provide the user with information from these sensors that is as accurate as possible. During operation, a number of these sensors require direct communication with the ambient environment. This direct communication, however, can lead to conditions under which the sensors often provide less than desirable accuracy. Accordingly, there is a need for components and methods that allow for the detection of the environmental conditions of one or more sensors of an electronic device.

SUMMARY

According to some aspects of the present disclosure, an electronic device can include a housing defining an internal volume, a pressure sensor assembly disposed in the internal volume and in communication with an ambient environment, the pressure sensor assembly including a structure at least partially enclosing a sensor volume, a pressure sensor affixed to a die disposed in the sensor volume, and an exposed moisture detection conductor positioned in the sensor volume.

In some examples, detecting the presence of liquid in the sensor volume can include detecting a change in at least one of a resistance, a capacitance, or an inductance of a circuit including the exposed moisture detection conductor. The electronic device can further include an array of exposed moisture detection conductors positioned in the sensor volume to detect the presence of the liquid. The exposed moisture detection conductor can include a wire loop, or single ended vertical wire, or pin. The exposed moisture detection conductor can be bonded to a pad of the die, or pads on a base substrate.

According to some aspects, a pressure sensor assembly can include a structure at least partially enclosing a sensor volume, a pressure sensor affixed to a die disposed in the sensor volume, and an exposed moisture detection conductor positioned in the sensor volume to detect a presence of a liquid in the sensor volume.

In some examples, the pressure sensor assembly can detect the presence of the liquid by detecting a change in a resistance of a circuit including the exposed moisture detection conductor. The pressure sensor assembly can detect the presence of the liquid by detecting a change in at least one of a capacitance or an inductance of a circuit including the exposed moisture detection conductor. The pressure sensor assembly can further include an array of exposed moisture detection conductors positioned in the sensor volume to detect the presence of the liquid. The exposed moisture detection conductor can include a wire loop. The pressure sensor assembly can further include a gel at least partially occupying the sensor volume. The exposed moisture detection conductor can be positioned at least partially disposed in the gel, and can protrude from the gel by at least 100 microns. The structure can include a wall of conductive material at least partially surrounding the sensor volume, and the exposed moisture detection conductor and the wall can be electrically connected. The structure can include a ceramic material at least partially surrounding the sensor volume, and a conductive contact electrically connected to the exposed moisture detection conductor. The exposed moisture detection conductor can include a wire coated with a corrosion resistant material.

According to some aspects, a method of sensing a liquid at a pressure sensor assembly can include monitoring an environment directly overlying a pressure sensor for a presence of a liquid, detecting the presence of the liquid in the environment, and initiating a remedial action in response to detecting the presence of the liquid in the environment. In some examples, the remedial action can include at least one of turning on a heating element, modifying a signal produced by the pressure sensor assembly, or disregarding a signal produced by the pressure sensor assembly. Detecting the presence of the liquid in the environment can include detecting a change in an electrical property of a circuit including a structure at least partially enclosing a volume around the pressure sensor and an exposed moisture detection conductor positioned in the environment. The moisture detection property can be at least one of a resistance, an inductance, or a capacitance of the circuit. The method can further include bonding a moisture detection conductor to a die of the pressure sensor prior to the monitoring.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
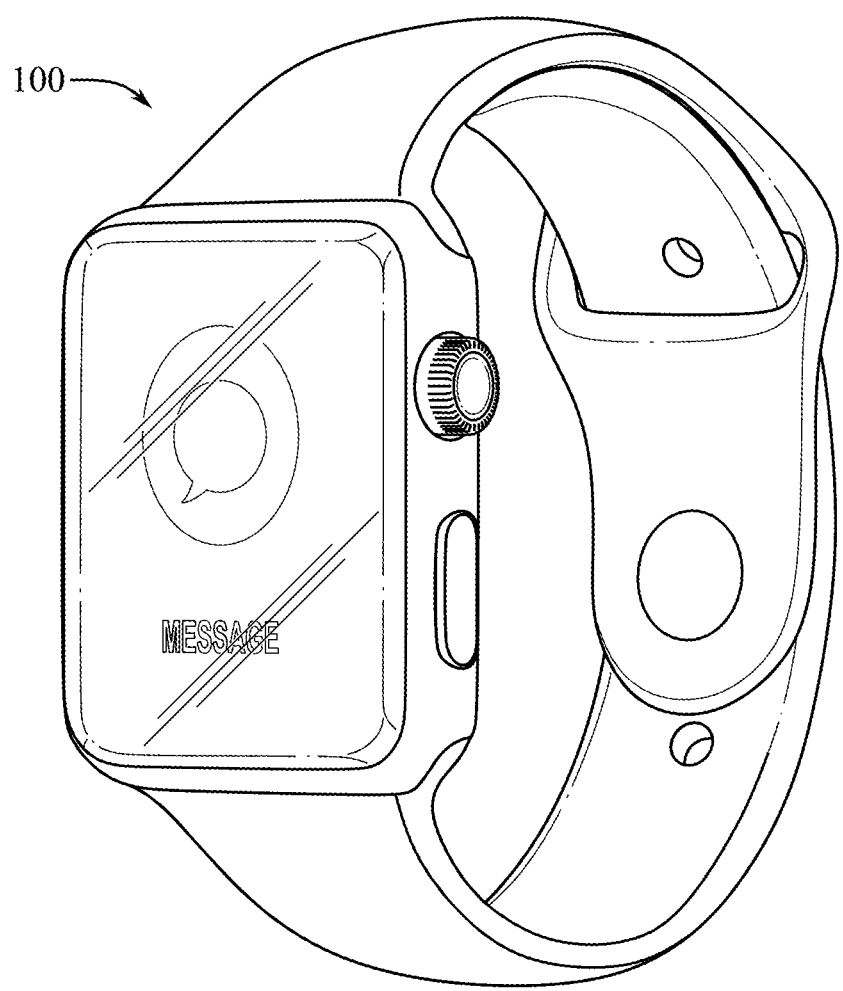
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

According to some embodiments, an electronic device can include a housing defining an internal volume, and an aperture that can allow communication between a portion of the internal volume and the ambient environment external to the housing. A pressure sensor assembly can be disposed in the portion of the internal volume in communication with the ambient environment. The pressure sensor assembly can include a structure at least partially enclosing a sensor volume and a pressure sensing component disposed in the sensor volume. The structure at least partially enclosing the sensor volume can include or be formed from a conductive material. The pressure sensor assembly can further include an exposed electrical conductor, such as a wire or a wire loop that is positioned at least partially within the sensor volume. The structure and the exposed electrical conductor (also referred to as a moisture detection conductor) can form a circuit having electrical properties that can detectably change when a liquid is present in or near the sensor volume. In some examples, by monitoring one or more of these properties and detecting a change therein, the presence of a liquid in the sensor volume can be detected.

Electronic devices increasingly include various sensors that are designed to interact with, and provide a user with information about, the ambient environment outside the electronic device. One example of such a sensor is an air pressure sensor that can measure and monitor the ambient air pressure around the device. The data provided by such an air pressure sensor can have a variety of uses, for example, it can assist monitoring or predicting weather events, and/or it can be used to determine an altitude of the device. Even very small variations in altitude, such as on the order of meters or even centimeters, can be detected by an air pressure sensor. This information can be used to determine, for example, if a user has climbed a flight of stairs, or even if a user has moved from a prone position to a standing position. In order to achieve such precise measurements, it can be important to know whether the air pressure sensor is providing accurate pressure readings.

In some examples, such as when the electronic device including an air pressure sensor is a wearable device like a smart watch, it can be desirable for the device to be able to withstand numerous types of ambient environments. For example, a wearable device including an air pressure sensor can be designed to be waterproof or operationally submersible in water for a desired duration. As the air pressure sensor must be in communication with the ambient environment to function, when the electronic device is exposed to an environment including liquids such as water, this liquid can enter the portion of the internal volume containing the pressure sensor assembly.

Conventional pressure sensors can be waterproof and can include a material, such as a gel, around the pressure sensing component to prevent liquid from contacting the sensing component or other components of the assembly, preventing the liquid from shorting out, corroding, or otherwise damaging the sensing component. The gel can be a viscous gel, for example, a polymeric gel, and is such that the sensing component can still detect the ambient air pressure when surrounded by the gel. Problems can arise, however, if a liquid remains at or near the pressure sensor once the device is no longer in a liquid environment. For example, water can enter the portion of the internal volume including the sensor and can remain there after the device has been removed from the water. This remaining liquid can have an impact on the air pressure readings produced by the pressure sensor, resulting in inaccurate air pressure readings.

Further, in some embodiments the concepts and structures described herein can apply to other forms of sensors and components, not only to pressure sensors. For example, any form of sensor that can communicate or interact with the ambient environment can be used with the structure and concepts described herein, such as a chemical sensor, optical sensor, or any other sensor as desired. In some examples, although described generally as a pressure sensor or sensor, the concepts and structures described herein can be applied to other components of an electronic device that may not include a sensing function, but which can be in communication with the ambient environment and on which the presence of liquid may be undesirable or may impede or inhibit a desired level of performance in some way.

Accordingly, it can be desirable to be able to detect when there is liquid at or near a component such as a pressure sensor, for example, to initiate one or more remedial actions based on such a detection. These remedial actions can include turning on a heater or a vibrational component to remove the liquid from the pressure sensor, modifying a signal produced by the pressure sensor assembly, and/or disregarding or discounting a signal produced by the pressure sensor assembly. In some examples, the remedial action can include disregarding the signal produced by the pressure sensor assembly and utilizing other components of the device to provide information, such as air pressure or altitude information previously determined by the air pressure sensor. Further, these remedial actions can be carried out for components that may not be a sensor and can be, for example, a speaker or other component.

Any of these remedial actions can be carried out until the presence of the liquid at or near the component or pressure sensor is no longer detected, or until a desired detection threshold, desired time, or other condition has been satisfied. In some examples a remedial action can be carried out based on other conditions or inputs of the device. For example, where the electronic device is a watch and the component is a speaker, the device may be able to detect when it is submerged, such as when a user wearing the device is swimming. When the device is no longer submerged, some liquid may still be undesirably present at the speaker and can, for example, disrupt the sound produced by the speaker. Upon recognizing that the device is no longer submerged, the component can automatically monitor the speaker for the presence of a liquid and initiate a remedial action such as activating the speaker to remove the liquid without the need for any input from the user.

Importantly, liquid can affect the effectiveness of the pressure sensor if present at very specific locations of the pressure sensor, such as directly overlying the sensor volume defined by the structure of the pressure sensor assembly. The detection of liquid at other locations can be less useful because liquid at these locations will not affect sensor readings to the same degree, and can cause the unnecessary initiation of remedial actions. Thus, the detection of liquid at specific locations at, or adjacent to, the pressure sensor should be achieved with components that do not interfere with the operation of the pressure sensor, such as by blocking communication with the ambient environment, and further that do not undesirably increase the size or complexity of the pressure sensor assembly, thereby increasing the size of the device containing the sensor and/or the cost.

In some embodiments, the detection of liquid at such a specific location can be achieved by bonding an exposed electrical conductor to a component of the pressure sensor assembly, such as the sensor die or a circuit board carrying the sensor. The exposed electrical conductor can be a wire or a wire loop and can be bonded by a conventional bonding process, such as a wire bonding process. Accordingly, the inclusion of such an exposed electrical conductor in a pressure sensor assembly can result in a negligible increase in sensor size and/or production costs. The exposed electrical conductor can be part of a circuit having electrical properties that can detectably change when a liquid is present in or near the sensor volume.

These and other embodiments are discussed below with reference to FIGS. 1-25. However, those skilled in the art will readily appreciate that the detailed description given herein with respect to these Figures is for explanatory purposes only, and should not be construed as limiting.

FIG. 1 shows an embodiment of an electronic device 100. The electronic device shown in FIG. 1 is a watch, such as a smartwatch. The smartwatch 100 of FIG. 1 is merely one representative example of a device that can be used in conjunction with the components and methods disclosed herein. The electronic device 100 can correspond to any form of wearable electronic device, portable media player, media storage device, portable digital assistant ("PDA"), tablet computer, computer, mobile communication device, GPS unit, remote control device, or other device. The electronic device 100 can be referred to as an electronic device, or a consumer device. Further details of the watch 100 are provided below with reference to FIG. 2.

Figure 2:
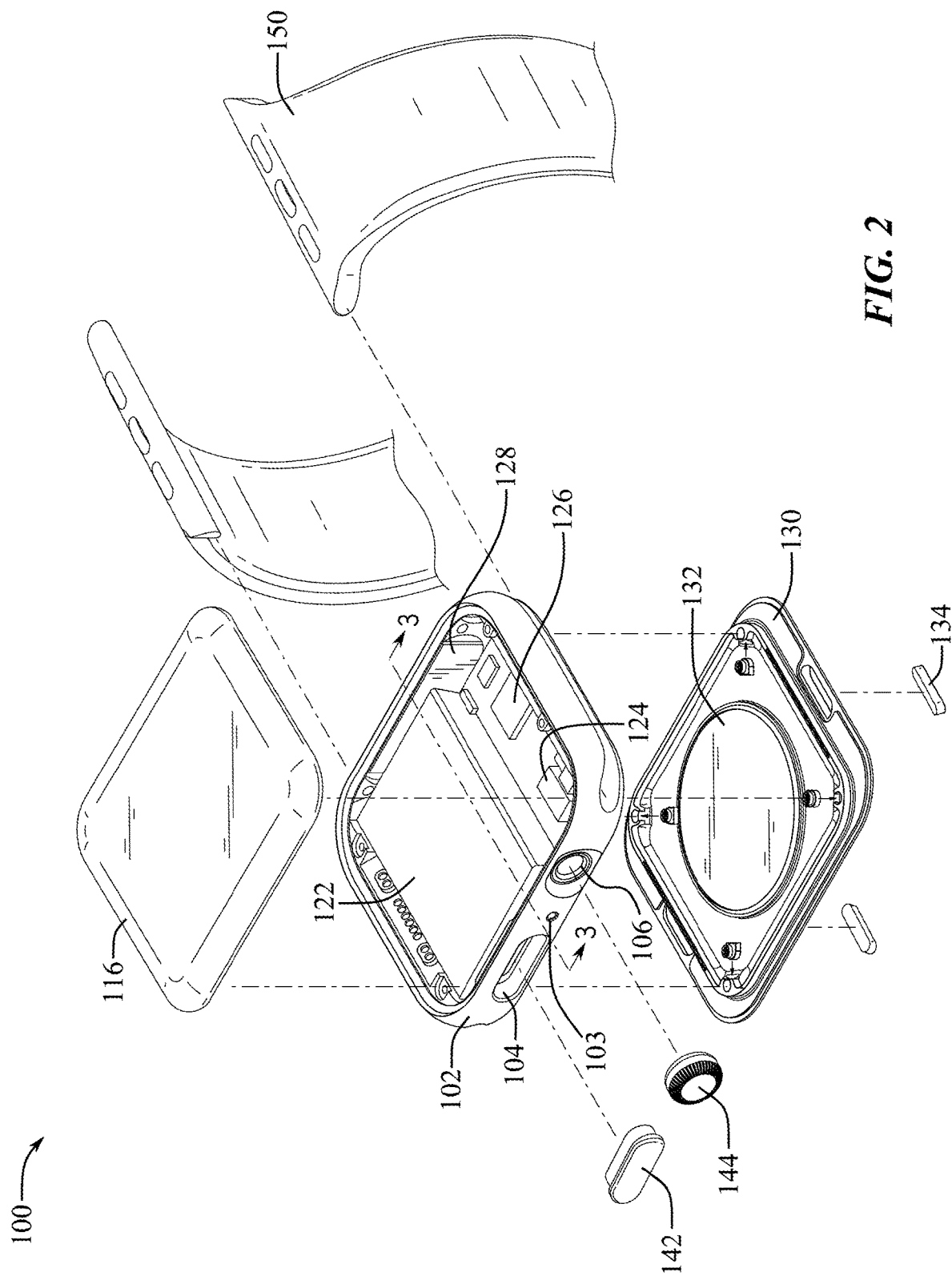
FIG. 2 shows an exploded perspective view of the electronic device of FIG. 1.

Referring now to FIG. 2, the electronic device 100 can include a housing 102, and a cover 116 attached to the housing. The housing 102 can substantially define at least a portion of an exterior surface of the device 100. The cover 116 can include glass, plastic, or any other substantially transparent material, component, or assembly. The cover 116 can cover or otherwise overlay a display, a camera, a touch sensitive surface such as a touchscreen, or other component of the electronic device 100. The cover 116 can define a front exterior surface of the device 100. A back cover 130 can also be attached to the housing 102, for example, opposite the cover 116. The back cover 130 can include ceramic, plastic, metal, or combinations thereof. In some examples, the back cover 130 can include an electromagnetically transparent portion 132. The electromagnetically transparent portion 132 can be transparent to any wavelength of electromagnetic radiation, such as visual light, infrared light, radio waves, or combinations thereof. The device, such as at the back cover 130, can also include any number or type of sealing components 134 that can serve to prevent the ingress of water or liquid into portions of the internal volume. Together, the housing 102, cover 116, and back cover 130 can substantially define an interior volume and exterior surface of the device 100.

The housing 102 can be a substantially continuous or unitary component, and can include one or more openings 104, 106 to receive components of the electronic device 100 and/or provide access to an internal portion of the electronic device 100. Additionally, other components of the electronic device 100, can be formed from or can include a metallic material. In some embodiments, the device 100 can include input components such as one or more buttons 142 and/or a crown 144.

The electronic device 100 can further include a strap 150, or another component designed to attach the device 100 to a user, or to provide wearable functionality. In some examples, the strap 150 can be a flexible material that can comfortably allow the device 100 to be retained on a user's body at a desired location. Further, the housing 102 can include a feature or features that can provide attachment locations for the strap 150. In some embodiments, the strap 150 can be retained on the housing 102 by any desired techniques. For example, the strap 150 can include any combination of magnets that are attracted with magnets disposed within the housing 102, or retention components that mechanically retain the strap 150 against the housing 102.

The device 100 can also include internal components, such as a haptic engine 124, a battery 122, and a system in package (SiP), including one or more integrated circuits 126, such as processors, sensors, and memory. The SiP can also include a package. All or a portion of one or more internal components, for example, the package of the SiP, can be formed from, or can include, a metallic material.

The internal components, such as one or more of components 122, 124, 126, can be disposed within an internal volume defined at least partially by the housing 102, and can be affixed to the housing 102 via internal surfaces, attachment features, threaded connectors, studs, posts, or other features, that are formed into, defined by, or otherwise part of the housing 102 and/or the cover 116 or back cover 130.

In some embodiments, the attachment features can be formed relatively easily on interior surfaces of the housing 102, for example, by machining.

In some examples, the device 100 can include components that are disposed within the internal volume at least partially defined by the housing 102, but that can be in communication with an ambient environment external to the housing 102. For example, the device 100 can include a sensor assembly 128 that can be disposed in the internal volume defined by the housing 102, but that can be in communication with the ambient environment through an aperture or port 103 defined by the housing 102. In some examples, the aperture can be any desired size and can allow for exposure of at least a portion of the sensor assembly 128, for example, a pressure sensor, to the ambient environment. In some examples, the aperture can allow for direct communication between the sensor assembly 128 and the ambient environment. In some examples, however, the aperture can provide for indirect communication between the sensor assembly 128 and the ambient environment, for example, along a tortuous path or through a membrane or other component. Thus, in some embodiments, the aperture can allow for a level of communication between the sensor assembly 128 and the ambient environment that enables one or more sensors of the sensor assembly to function as desired.

Figure 3:
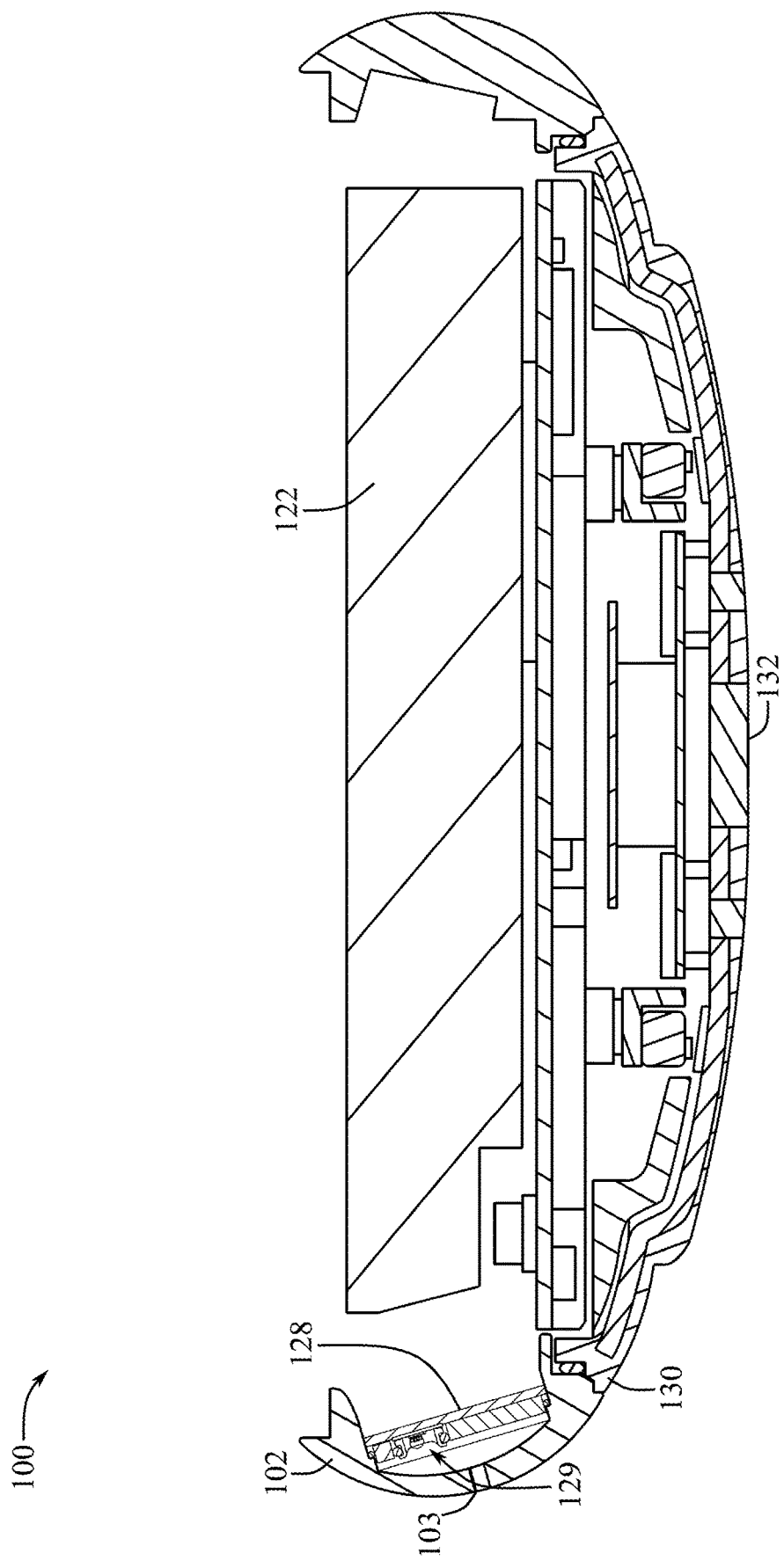
FIG. 3 shows a side cross-sectional view of the electronic device of FIG. 1.

Turning now to FIG. 3, a side cross-sectional view of certain components of the device 100 is illustrated. As can be seen, the housing 102 can define an internal volume of the device 100 that can have numerous components disposed therein, such as a battery 122. A back cover 130 can be attached to the housing 102 and can include an electromagnetically transparent portion 132. A sensor assembly 128, for example, including a pressure sensor 129 can be disposed in the internal volume.

As described above, the housing 102 can define an aperture 103 that can provide communication between the pressure sensor 129 of the sensor assembly 128 and the ambient environment, for example, fluid communication. In the present example, the aperture 103 can provide exposure or direct access to ambient air, and can provide communication between the sensor assembly 128 and the ambient environment. Further, the sensor assembly 128 can be disposed in a chamber, region, or portion of the internal volume that is environmentally isolated from the other components in the internal volume, such as the battery 122. That is, while the ambient environment can communicate with the portion of the internal volume in which the sensor assembly 128 is disposed, for example, through the aperture 103, other portions of the internal volume can be isolated from the ambient environment. This isolation can ensure that components in the internal volume, such as the battery 122, are not exposed to undesirable environmental conditions, such as undesirable levels of moisture or heat. Further, this isolation can be achieved by structures of the housing 102, by isolation components, such as seals, gaskets, or walls, and/or by the sensor assembly 128 itself.

Any number or variety of electronic devices can include a component or components including a liquid sensor, as described herein. The process for using such a liquid sensing component to detect the presence of a liquid, for example, at or near one or more sensors or other components, can include detecting a change in an electrical property of a circuit including the liquid sensing component. The liquid sensing component can include an exposed electrical conductor that can contact a liquid disposed at or near the one or more sensors or other components. Various examples of components, assemblies, and devices including liquid sensing components as described herein, and processes for using and forming the same are described below with reference to FIGS. 4-5.

Figure 4:
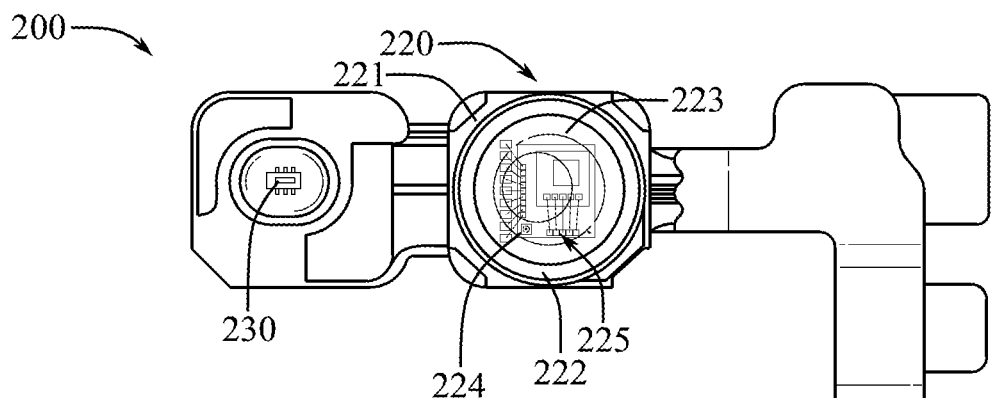
FIG. 4 shows a top view of a component of an electronic device.

FIG. 4 shows a top view of a pressure sensor assembly 200 that can be included in an electronic device, as described herein. The pressure sensor assembly 200 can include some or all of the features of sensor assembly 128 described with respect to FIGS. 1-3. In the present example, the pressure sensor assembly 200 can include a pressure sensor 220 that is electrically coupled to a connector 240 and a processor 230. In some examples, the connector 240 can include one or more contact portions or pads 242, 244, 246 that can electrically connect the assembly 200 to other components of the device, such as a battery, to provide electrical power to the sensor assembly 200. The connector 240 can also allow the sensor assembly 200 to send and receive signals with other components of the device, as described herein.

A processor 230 can be electrically coupled with the pressure sensor 220 and can send or receive signals from the pressure sensor 220. In some examples, the processor 230 can facilitate not only the detection or measurement of the air pressure of the ambient environment via the pressure sensor 220, but can also detect a change in one or more electrical properties of a liquid sensing component, as described herein. The processor 230 can also provide additional functions, for example, the processor 230 can initiate a remedial action based on the detection of a liquid at the pressure sensor 220, as described herein. While the present example shows that the sensor assembly 220 includes a processor 230, in some examples, the assembly 200 does not include a processor 230 and the pressure sensor 220 can be in communication with one or more other processors of the electronic device.

Figure 5:
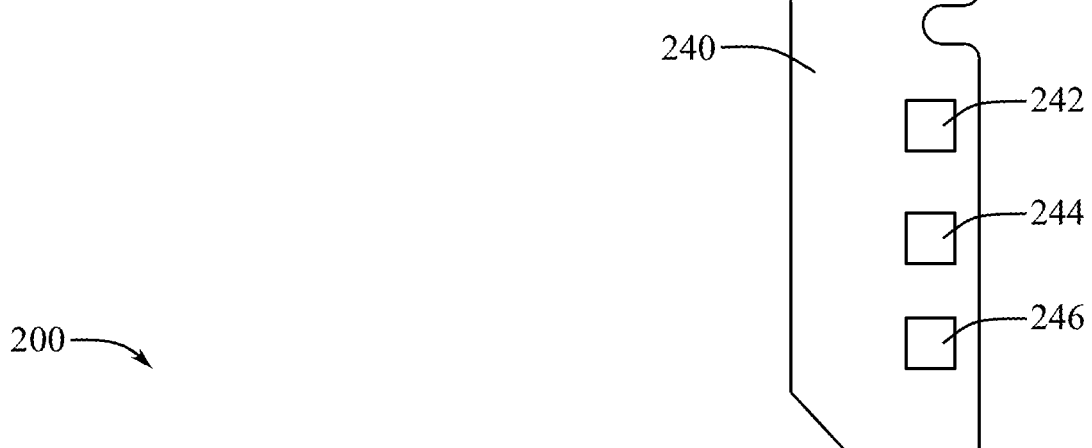
FIG. 5 shows a perspective view of a component of an electronic device.
Figure 5:
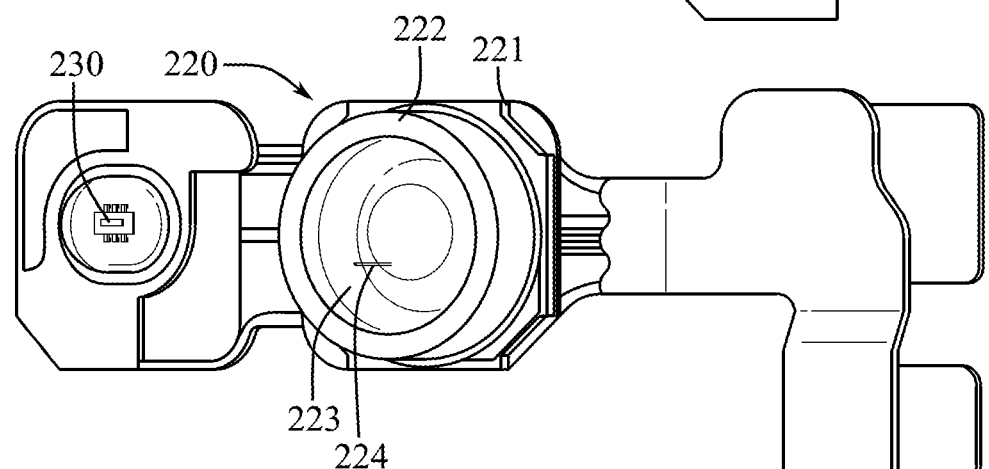

As illustrated in FIGS. 4 and 5, the pressure sensor 220 can include a structure 222 that can at least partially enclose or define a sensor volume. In some examples, the structure 222 can have a hollow tube or cylinder shape. In some other examples, any desired shape can be used. The structure 222 can be situated on a base or plate 221 that can further define or enclose the sensor volume. Accordingly, in some examples, the base 221 and the structure 222 can at least partially enclose a sensor volume that is open to, or in communication with, the internal volume and the ambient environment, at least at one location or side.

In some examples, the base 221 can be substantially any desired material, such as a polymeric material, ceramic material, metallic material, or combinations thereof. In some examples, the base 221 can be a printed circuit board or a ceramic substrate, and can include one or more electrical components thereon, in addition to the structure 222, as described herein. In some embodiments, the structure 222 can include a conductive material, such as a metallic material, a conductive polymer material, and/or a conductive ceramic material. In some examples, all or a portion of the structure 222 can be a conductive material. For instance, as illustrated in FIGS. 4 and 5, substantially the entire structure 222 can be a metallic material. In some other examples, however, the structure 222 can include a non-conductive material, such as a non-conductive ceramic or polymer, and can further include one or more conductive portions, as described herein.

The pressure sensor 220 can include an exposed electrical conductor 224 that is at least partially disposed in the sensor volume. As described further herein, in some examples, the exposed electrical conductor 224 can be disposed on the base 221, on a component on the base 221, or at any location in, near, or adjacent to the sensor volume. In this particular example, the exposed electrical conductor 224 is a wire that is disposed on the base 221, and the exposed electrical conductor can be joined to the base 221 by a conventional wire bonding process. In some examples, the exposed electrical conductor 224 can be positioned entirely within the sensor volume. In some examples, the exposed electrical conductor 224 can protrude from the sensor volume a desired amount. For example, the exposed electrical conductor 224 can protrude at least about 100 microns, at least about 200 microns, at least about 300 microns, at least about 400 microns, or at least about 500 microns or more above a top surface of the structure 222.

A pressure sensing component 225 can be disposed within the sensor volume, for example, on a die that is disposed on the base 221. The pressure sensing component 225 can be any type or form of desired sensing component as known in the art or as discovered in the future, such as a microelectromechanical systems (MEMS) pressure sensor. In some examples, the component 225 can be a different type of sensor, such as a chemical sensor, or any other environmental sensor as is known in the art or developed in the future. Further, a protective gel 223 can be disposed in the sensor volume and can protect the pressure sensing component 225 from any liquid, such as water, that might enter the sensor volume or otherwise contact the pressure sensing component 225 were the gel 223 not present. The gel 223 can still allow the pressure sensing component 225 to detect or measure the pressure of the ambient environment without undesirably impacting the function of the pressure sensing component 225. In some examples, the gel 223 does not fill the entire sensor volume. Further, in some embodiments, the exposed electrical conductor 224 can be at least partially disposed in or surrounded by the gel 223. That is, the exposed electrical conductor 224 can protrude from the gel 223 a desired distance or amount, for example, at least about 100 microns, at least about 200 microns, at least about 300 microns, at least about 400 microns, or at least about 500 microns.

Any number or variety of electronic devices can include a component or components including a liquid sensor, as described herein. The process for using such a liquid sensing component to detect the presence of a liquid, for example, at or near one or more sensors or other components, can include detecting a change in an electrical property of a circuit including the liquid sensing component, as described herein. The liquid sensing component can include an exposed electrical conductor that can contact a liquid disposed at or near the one or more sensors or other components. Various examples of components, assemblies, and devices including liquid sensing components as described herein, and processes for using and forming the same are described below, with reference to FIGS. 6-9.

Figure 6:
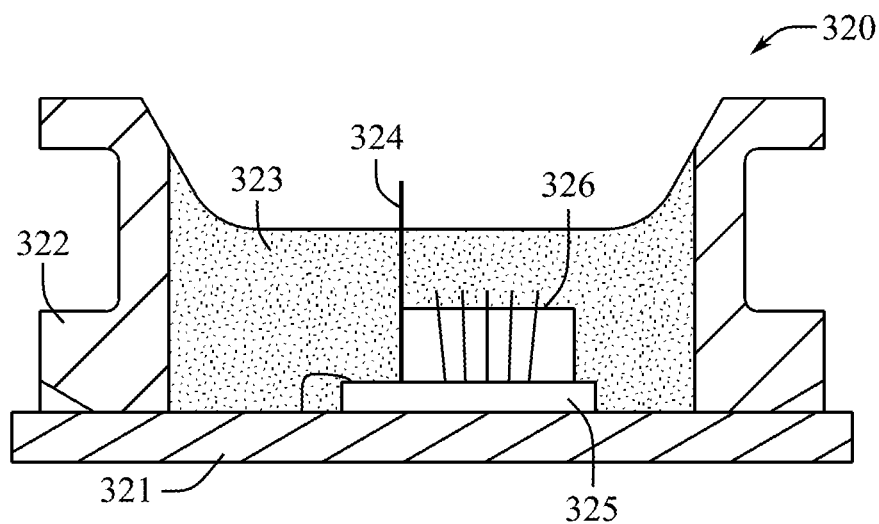
FIG. 6 shows a cross-sectional view of a component of an electronic device.

FIG. 6 illustrates a cross-sectional view of a pressure sensor 320. The pressure sensor 320 can be substantially similar to, and can include some or all of the features of, pressure sensors 129, 220 described herein. In this example, the pressure sensor 320 can include a structure 322 that is disposed on, and affixed to, a base 321. The structure 322 can include any form of conductive material, such as a metallic material, as described herein. The base 321 can include a printed circuit board or a ceramic substrate. The structure 322 and the base 321 can at least partially enclose a sensor volume that is in communication with the ambient environment. In this example, the structure 322 can have a substantially cylindrical shape, but can also include one or more non-planar sidewalls. While the interior sidewalls of the structure 322 are illustrated as being planar in this example, the outer sidewalls can include a groove or recess that can extend partially or entirely around the structure 322. Thus, the structure 322 can include a lip that extends outwardly therefrom, as shown.

A component, such as sensor die 325, can be disposed on or affixed to the base 321, and can further be in electrical communication with one or more other components of the device, for example, through vias or wires embedded in or part of the base 321. The sensor die 325 can include a number of pads or electrical contacts, and can include a pressure sensing component 326 disposed thereon or affixed thereto, for example, by soldering or another bonding method. A gel 323 is disposed in the sensor volume such that it surrounds the pressure sensing component 326.

In this example, the exposed electrical conductor 324 is a metallic wire that is affixed or bonded to the sensor die 325 at a location adjacent or near to the pressure sensing component 326. In some examples, the exposed electrical conductor 324 can be bonded to the die by a conventional wire bonding process. Such a process can already be used to bond, for example, the pressure sensing component 326 or other components to the die 325, thus the bonding of the exposed electrical conductor 324 to the die by this method can add a small or negligible amount of cost or processing time to the assembly of the pressure sensor 320. As can be seen, the exposed electrical conductor 324 is disposed entirely within the sensor volume, but can protrude above the gel 323 by a desired amount, such as by at least about 100 microns, at least about 200 microns, at least about 300 microns, at least about 400 microns, or at least about 500 microns. As described herein, the exposed electrical conductor 324 can be in electrical communication with and form an electrical circuit with the structure 322, for example, through the die 325 and/or the base 321. Additional sensor structures and configurations are described below with reference to FIG. 7.

Figure 7:
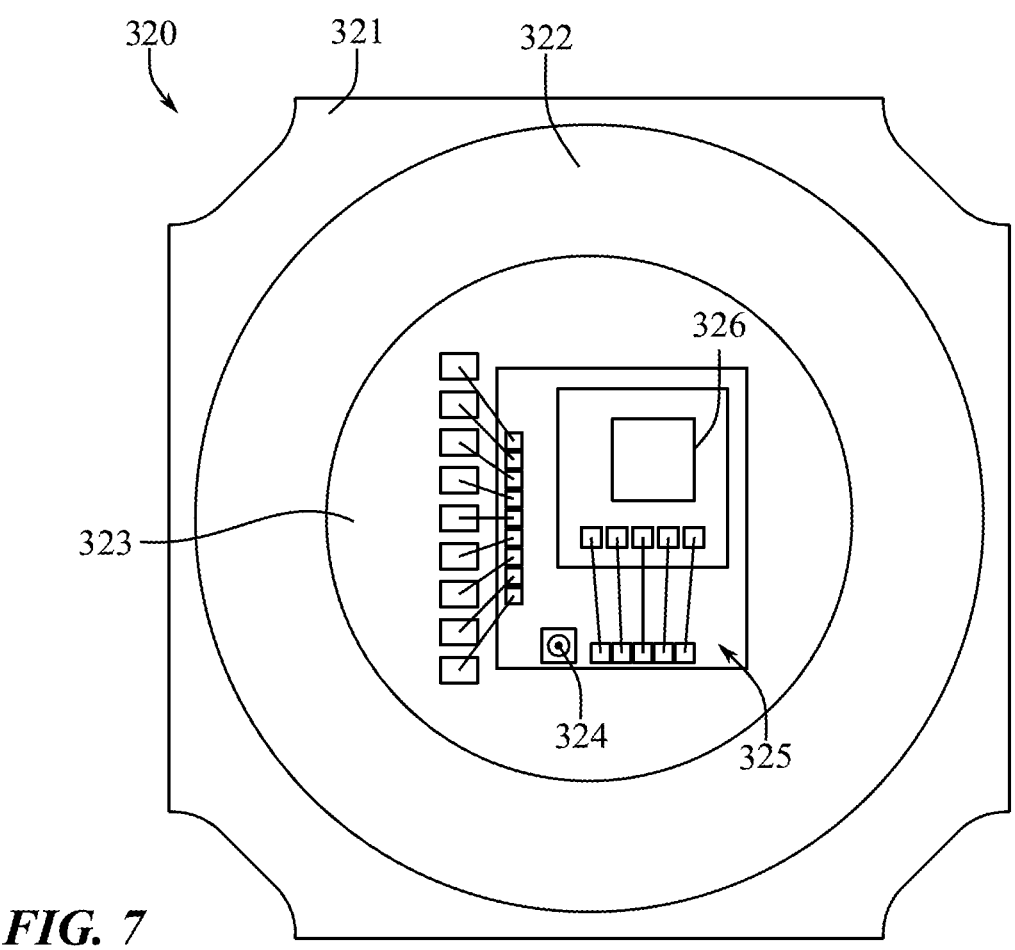
FIG. 7 shows a top view of the component of FIG. 6.
Figure 8A:
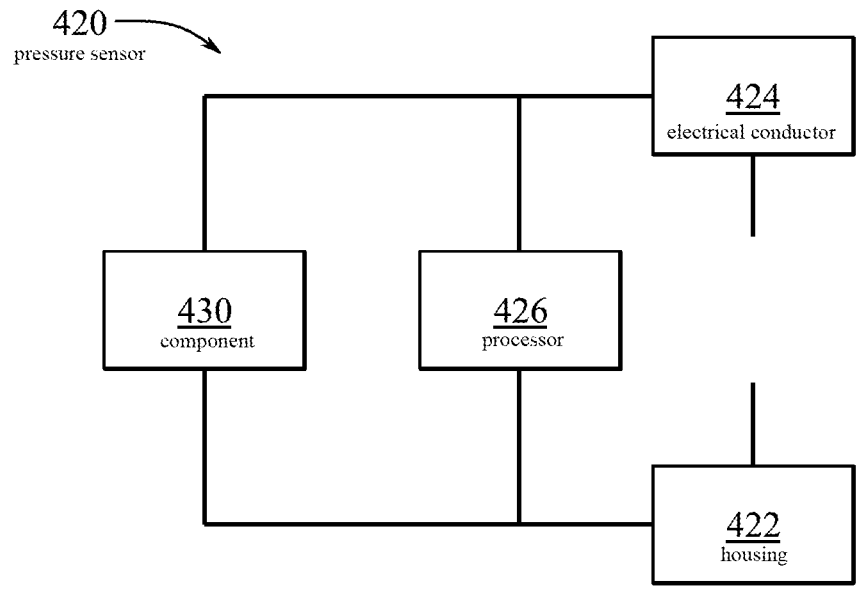
FIG. 8A shows a schematic diagram of components of an electronic device.
Figure 8B:
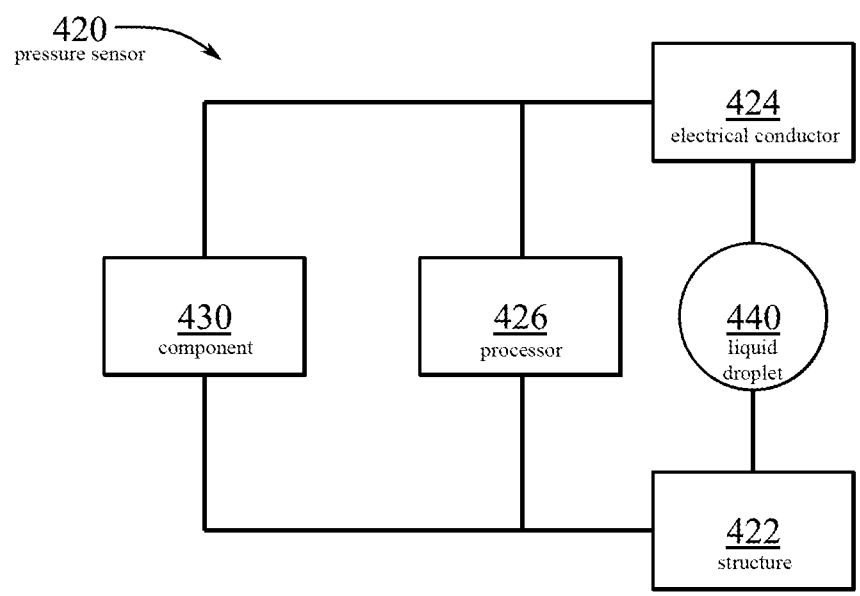
FIG. 8B shows a schematic diagram of components of an electronic device and a liquid.

FIG. 7 illustrates a top view of an embodiment of a pressure sensor 320. The pressure sensor 320 can be substantially similar to, and can include some or all of the features of, pressure sensors 129 and 220 described herein. In this example, the pressure sensor 320 can include a structure 322 that includes a conductive material and is disposed on and affixed to a base 321. The structure 322 can have a substantially cylindrical or tubular shape, as shown, and can at least partially enclose a sensor volume. As can be seen, the sensor die 325, including a pressure sensing component thereon, is disposed on the base 321 and can be electrically connected thereto through one or more pads or vias. A gel 323 can be disposed in the sensor volume and can surround the die 325. The die 325 can also include a sensing component 326, in addition to one or more other components, such as processors, to form a circuit therewith. An exposed electrical conductor 324 can be bonded to sensor die pad 325, for example, by a conventional wire bonding process. The bonding of the exposed electrical conductor 324 to the die 325 can occur at the same time as, before, or after wire bonding processes that can be used to connect the sensing component 326 to the die 325 to form the pressure sensor 320. FIGS. 8A and 8B illustrates schematic views of an embodiment of a pressure sensor 420.

The pressure sensor 420 of FIGS. 8A and 8B can be substantially similar to, and can include some or all of the features of, pressure sensors 129, 220, 320 described herein. As described with respect to FIGS. 4-7, the pressure sensor 420 can include an exposed electrical conductor 424 and a housing 422 including a conductive material. As described herein, the exposed electrical conductor 424 and the structure 422 are in electrical communication with one another and together form an electrical circuit. In some examples, this circuit can be an open circuit. The circuit can have electrical properties, such as a resistance, a conductance, an inductance, and other electrical properties that can be measured, for example, by a processor 426 or other component 430 that is connected to or a part of the circuit.

In the present example and as shown in FIG. 8A, the exposed electrical conductor 424 and the structure 422 form a circuit that is open when no liquid is present to complete the circuit. As shown in FIG. 8B, however, the liquid droplet 440 can contact both the exposed electrical conductor 424 and the structure 422, thus completing the circuit. The completed circuit will now have a measurable resistance, a conductance, an inductance, and/or other properties that differ from the values associated with the circuit when no liquid 440 is present, accordingly, by measuring one or more of these values or detecting a change in one or more of these values, such as with the processor 430, the presence of liquid at or near the pressure sensor 420 can be detected, as described herein.

Figure 9:
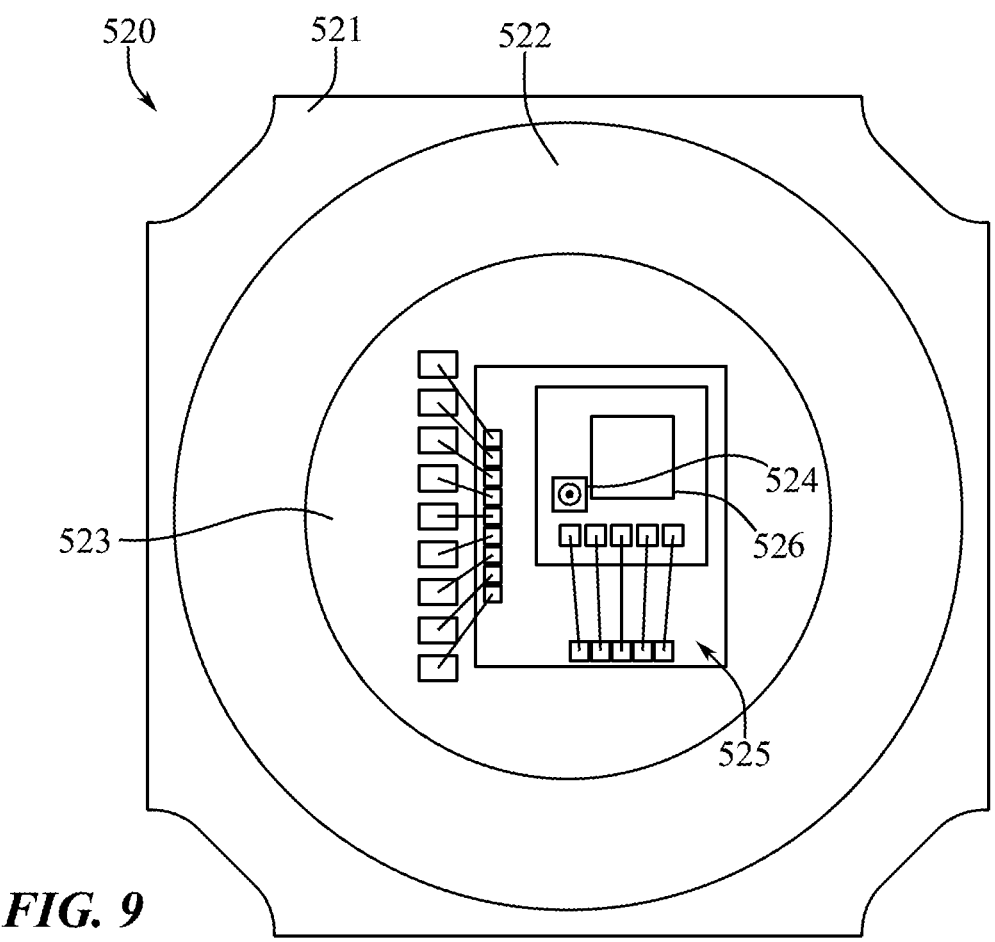
FIG. 9 shows a top view of a component of an electronic device.
Figure 10:
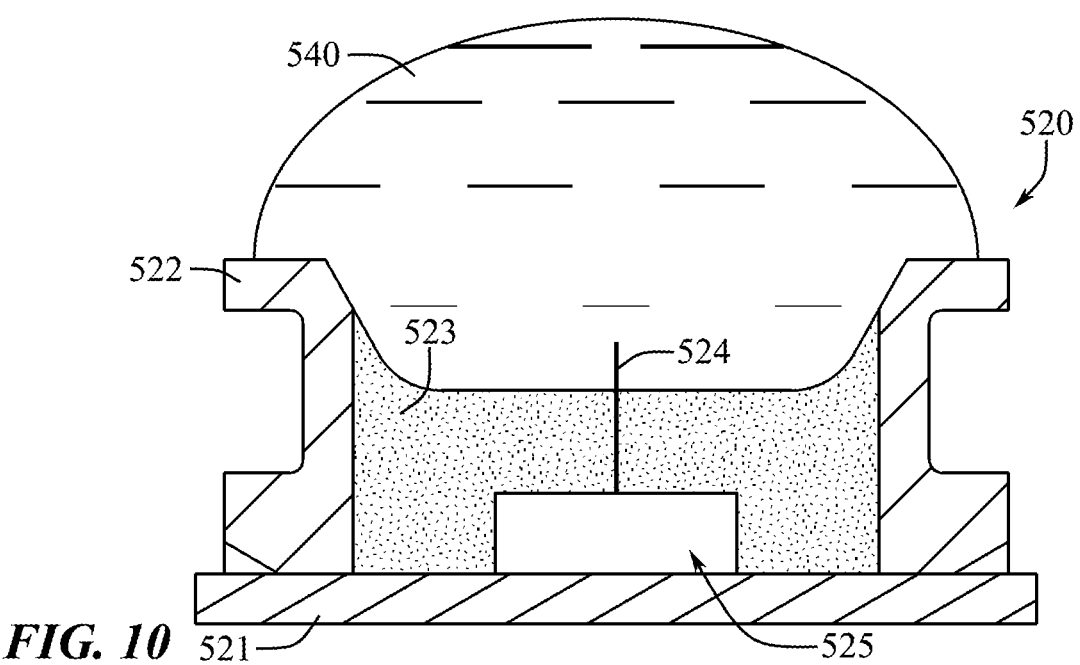
FIG. 10 shows a cross-sectional side view of a component of an electronic device and a liquid.

While the liquid droplet 440 is shown as contacting both the conductive structure 422 and the exposed electrical conductor 424, it should be understood that a liquid droplet 440 only needs to contact one or the other of the exposed electrical conductor 424 and the structure to produce a detectable change in the resistance, capacitance, inductance, and/or other electrical properties of the circuit defined by the structure 422 and the exposed electrical conductor 424. In some examples, a liquid need not contact either of the structure 422 and the exposed electrical conductor 424, and can be within a desired distance of either to produce a detectable change in the resistance, capacitance, inductance, and/or other electrical properties of the circuit defined by the structure 422 and the exposed electrical conductor 424. Further, in some examples, the circuit including the structure 422 and the exposed electrical conductor 424 can be either an open circuit or a closed circuit and can produce a detectable change in the resistance, capacitance, inductance, and/or other electrical properties of the circuit in the presence of a liquid 440 that contacts or is sufficiently near to one or both of the structure 422 and the exposed electrical conductor 424. FIGS. 9 and 10 illustrate cross-sectional views of another embodiment of a pressure sensor 520.

The pressure sensor 520 of FIG. 9 can be substantially similar to, and can include some or all of the features of, pressure sensors 129, 220, 320, 420 described herein. In this example, the pressure sensor 520 can include a structure 522 that includes a conductive material and is disposed on and affixed to a base 521. The structure 522 and the base 521 at least partially enclose a sensor volume, and a protective gel 523 is disposed therein. A pressure sensing component 525 is also disposed in the sensor volume, is surrounded by the gel 523, and is affixed to the base 521. Whereas the pressure sensor 320 illustrated in FIG. 6 included an exposed electrical conductor 324 disposed on a die 325 to which a pressure sensing component 326 was also affixed, in the present example, the exposed electrical conductor 524 can be disposed directly on the pressure sensing component 526 that is bonded to the die 525. In some examples, the exposed electrical conductor 524 can be bonded to the pressure sensing component 526 by a wire bonding process and can be in electrical communication with the structure 522, as described herein. As can be seen, the exposed electrical conductor 524 is disposed entirely within the sensor volume but can protrude above the gel 523 by a desired amount, such as by at least about 100 microns, at least about 200 microns, at least about 300 microns, at least about 400 microns, or at least about 500 microns. Additional features of the pressure sensor 520 are provided below with reference to FIG. 10.

FIG. 10 illustrates a cross-sectional view of the pressure sensor 520 including a liquid droplet 540 disposed over the pressure sensor 520 and partially within the sensor volume. In some examples, the liquid droplet 540 can be a water droplet. As can be see, the liquid droplet 540 is prevented from directly contacting the sensing component 525 by the protective gel 523. The liquid droplet 540 has, however, at least partially occluded the open portion defined by the structure 522 that allowed for communication between the sensing component 525 and the environment through the gel 523. Accordingly, in the present condition, the liquid droplet 540 can disrupt, interfere with, or otherwise undesirably influence the air pressure readings detected by the pressure sensing component 525.

As can be seen, however, the exposed electrical conductor 524 disposed in the sensor volume and protruding from the gel 523 is contacting, and at least partially surrounded by, the liquid droplet 540. Further, the liquid droplet 540 is also contacting a conductive portion of the structure 522. As described herein, the exposed electrical conductor 524 and the structure 522 are in electrical communication with one another and together form an electrical circuit. In some examples, this circuit can be an open circuit. The circuit can have electrical properties, such as a resistance, a conductance, an inductance, and other electrical properties that can be measured, for example, by a processor or other component connected to the circuit.

In the present example, the exposed electrical conductor 524 and the structure 522 form a circuit that is open when no liquid is present to complete the circuit. As shown, however, the liquid droplet 540 can contact both the exposed electrical conductor 524 and the structure 522, thus completing the circuit. The completed circuit will now have a measurable resistance, a conductance, an inductance, and/or other properties that differ from the values associated with the circuit when no liquid 540 is present. Accordingly, by measuring one or more of these values or detecting a change in one or more of these values, the presence of liquid at the pressure sensor 520 can be detected, as described herein.

While the liquid droplet 540 is shown as contacting both the conductive structure 522 and the exposed electrical conductor 524, it should be understood that a liquid droplet 540 only needs to contact one or the other of the exposed electrical conductor 524 and the structure to produce a detectable change in the resistance, capacitance, inductance, and/or other electrical properties of the circuit defined by the structure 522 and the exposed electrical conductor 524. In some examples, a liquid need not contact either of the structure 522 and the exposed electrical conductor 524, and can be within a desired distance of either to produce a detectable change in the resistance, capacitance, inductance, and/or other electrical properties of the circuit defined by the structure 522 and the exposed electrical conductor 524. Further, in some examples, the circuit including the structure 522 and the exposed electrical conductor 524 can be either an open circuit or a closed circuit and can produce a detectable change in the resistance, capacitance, inductance, and/or other electrical properties of the circuit in the presence of a liquid 540 that contacts or is sufficiently near to one or both of the structure 522 and the exposed electrical conductor 524. Various examples of components, assemblies, and devices including liquid sensing components as described herein, and processes for using and forming the same are described below with reference to FIGS. 11-16.

Figure 11:
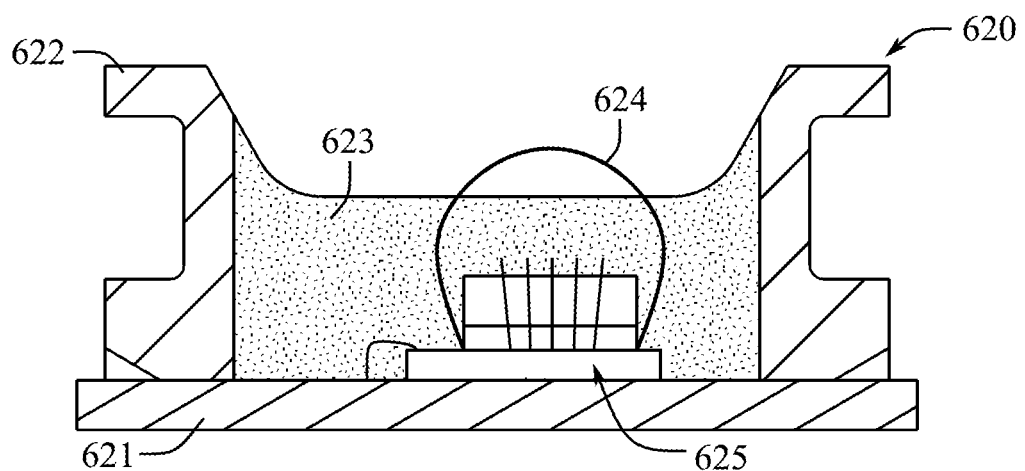
FIG. 11 shows a cross-sectional side view of a component of an electronic device.
Figure 12:
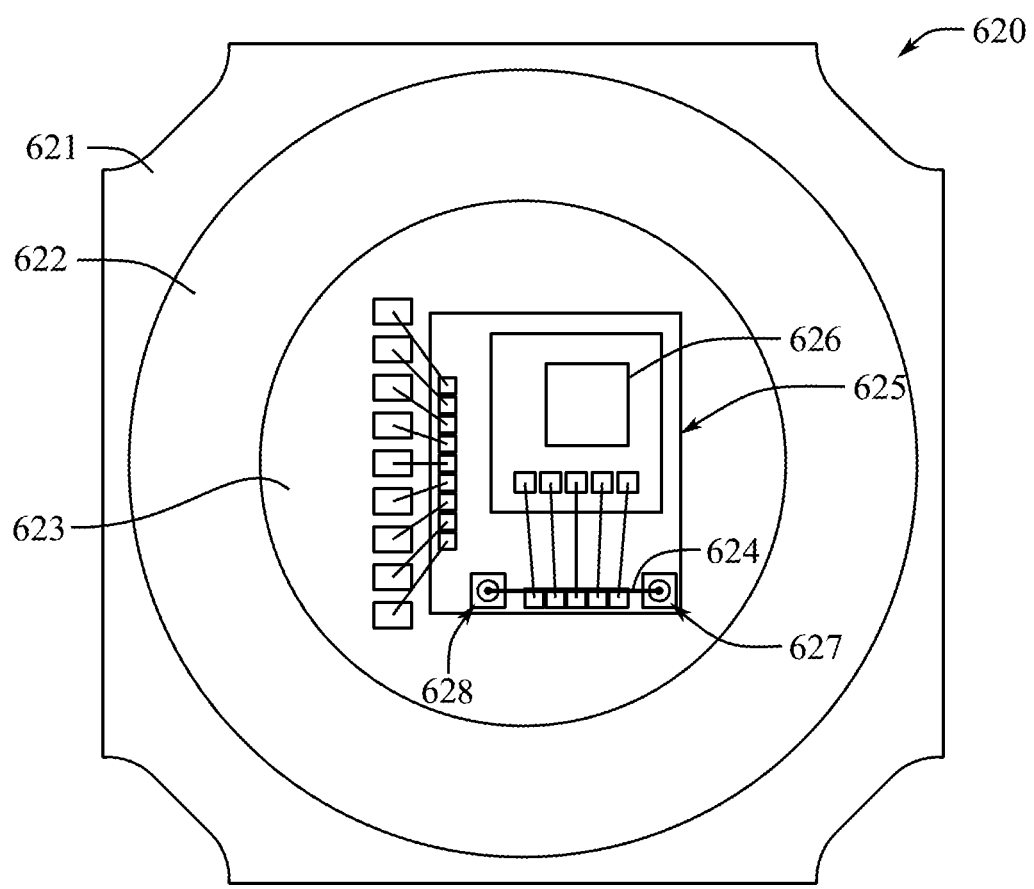
FIG. 12 shows a top view of a component of the electronic device of FIG. 11.

FIGS. 11 and 12 illustrate cross-sectional and top views, respectively, of a pressure sensor 620. The pressure sensor 620 can be substantially similar to, and can include some or all of the features of, pressure sensors 129, 220, 320, 420, 520 described herein. In this example, the pressure sensor 620 can include a conductive structure 622 that is disposed on and affixed to a base 621. The structure 622 and the base 621 can at least partially enclose a sensor volume that is in communication with the ambient environment. In this example, the structure 622 can have a substantially cylindrical shape, but can also include one or more non-planar sidewalls. A sensor die 625 can be disposed on, or can be affixed to, the base 621, and can further be in electrical communication with one or more other components of the device, for example, through vias or wires embedded in or on part of the base 621.

The sensor die 625 can include a number of pads or electrical contacts, and can include a pressure sensing component 626 disposed thereon or affixed thereto, for example, by soldering or another bonding method. A gel 623 is disposed in the sensor volume such that it surrounds the pressure sensing component 626. In this example, the exposed electrical conductor 624 can be a wire loop that includes a first end bonded or affixed to a first contact pad 627 on the die 625, and a second end bonded or affixed to a second contact pad 628 on the die 625. The pads 627, 628 can be disposed at any desired location on the die 625, and in some examples, can be near or adjacent to the sensing component 626 or substrate 621.

One or both of the ends of the wire loop 624 can be bonded to their respective contact pads 627, 628 by a conventional wire bonding process, as described herein. As can be seen, the exposed electrical conductor 524 is disposed entirely within the sensor volume, but can protrude above the gel 523 by a desired amount, such as by at least about 100 microns, at least about 200 microns, at least about 300 microns, at least about 400 microns, or at least about 500 microns. As with other examples described herein, the exposed electrical conductor 624 can be electrically connected to, and can form a circuit with, the structure 622 and can be used to detect the presence of a liquid at the pressure sensor 620, for example, as described with respect to FIG. 10. Additional exemplary structures are detailed below with reference to FIGS. 13 and 14.

Figure 13:
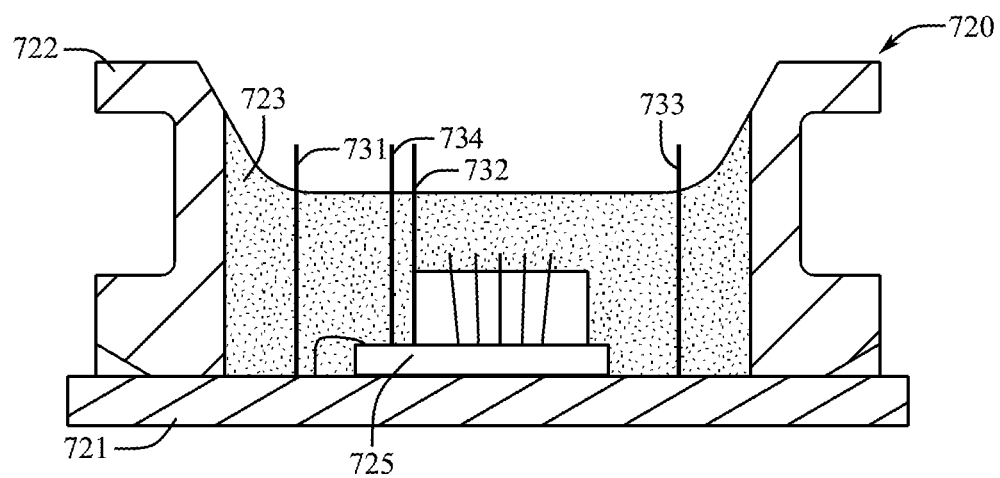
FIG. 13 shows a cross-sectional side view of a component of an electronic device.
Figure 14:
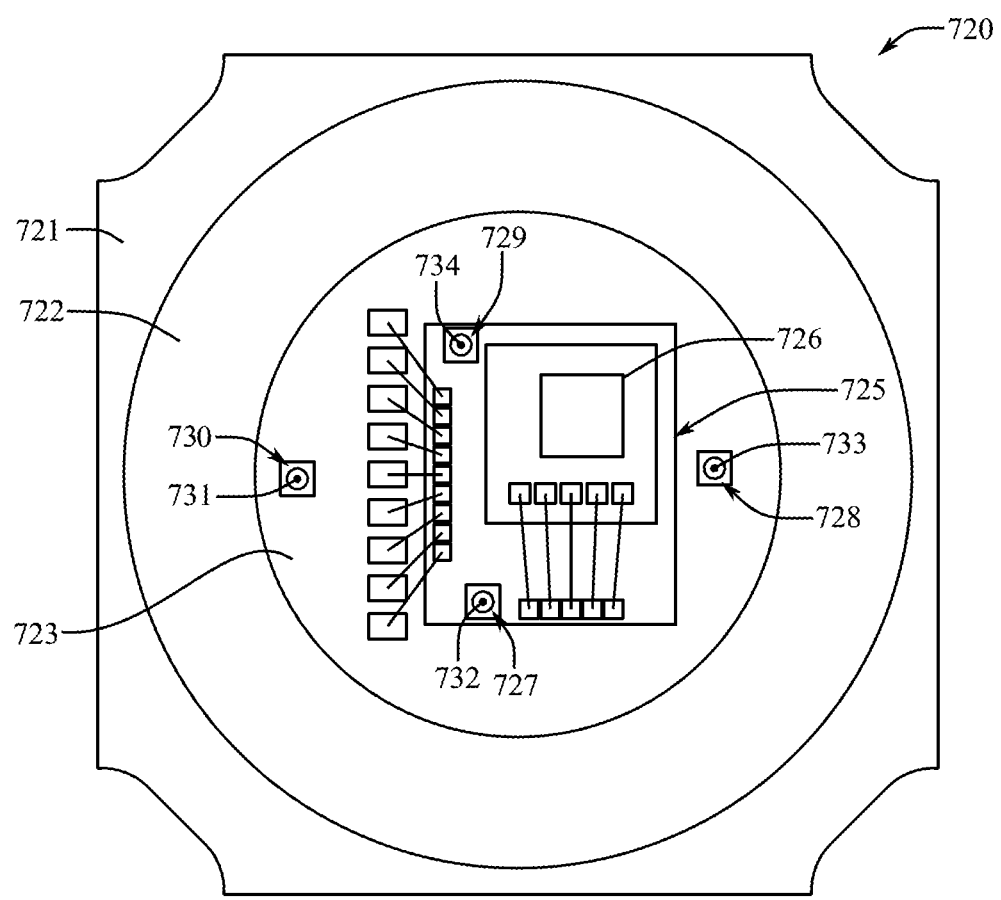
FIG. 14 shows a top view of a component of the electronic device of FIG. 13.

FIGS. 13 and 14 illustrate a cross-sectional and a top view of a pressure sensor 720, respectively. The pressure sensor 720 can be substantially similar to, and can include some or all of the features of, pressure sensors 129, 220, 320, 420, 520, 620 described herein. In this example, the pressure sensor 720 can include a conductive structure 722 that is disposed on and affixed to a base 721. The structure 722 and the base 721 can at least partially enclose a sensor volume that is in communication with the ambient environment. In this example, the structure 722 can have a substantially cylindrical shape, but can also include one or more non-planar sidewalls. A sensor die 725 can be disposed on or affixed to the base 721, and can further be in electrical communication with one or more other components of the device, for example, through vias or wires embedded in or on part of the base 721.

The sensor die 725 can include a number of pads or electrical contacts, and can include a pressure sensing component 726 disposed thereon or affixed thereto, for example, by soldering or another bonding method. A gel 723 is disposed in the sensor volume such that it surrounds the pressure sensing component 726. In this example, the pressure sensor 720 can include multiple exposed electrical conductors 731, 732, 733, 734 that can take any of the forms described herein. In the present example, the multiple exposed electrical conductors 731, 732, 733, 734 are shown as conductive wires. Each of the exposed electrical conductors 731, 732, 733, 734 can be bonded to a separate pad or electrical contact, and can be in electrical communication and form a circuit with the structure 722, as described herein. The contact pads 727, 728, 729, 730 can be disposed at any number of desired locations within the sensor volume. For example, one or more pads 727, 728, 729, 730 can be disposed on the sensor die 725. In some examples, one or more pads 727, 728, 729, 730 can be disposed on the base 721. In some examples, one or more pads 727, 728, 729, 730 can be disposed on the base 721, while one or more pads 727, 728, 729, 730 can be disposed on the sensor die 725.

In the illustrated example, two pads 727 and 729 can be disposed on the sensor die 725, while two pads 728, 730 can be disposed on the base 721. An end of each of the exposed electrical conductors 731, 732, 733, 734 can be bonded to the pads 727, 728, 729, 730, such as by a conventional wire bonding process, as described herein. Although illustrated as being arranged in an approximately cross-shaped pattern, the pads 727, 728, 729, 730 and exposed electrical conductors 731, 732, 733, 734 can be disposed at any desired location on the die 725 and/or base 721, and in some examples, can be near or adjacent to the sensing component 726. As can be seen, the exposed electrical conductors 731, 732, 733, 734 are disposed entirely within the sensor volume, but can protrude above the gel 723 by any desired amount, such as by at least about 100 microns, at least about 200 microns, at least about 300 microns, at least about 400 microns, or at least about 500 microns. In some examples, the exposed electrical conductors 731, 732, 733, 734 can all protrude the same amount above the gel 723, or by different amounts. As with other examples described herein, the exposed electrical conductors 731, 732, 733, 734 can be electrically connected to, and can form a circuit with, the structure 722, for example, in series, parallel, or combinations thereof, and can be used to detect the presence of a liquid at the pressure sensor 720, for example, as described with respect to FIG. 10. Additional sensor configurations are provided below with reference to FIGS. 15 and 16.

Figure 15:
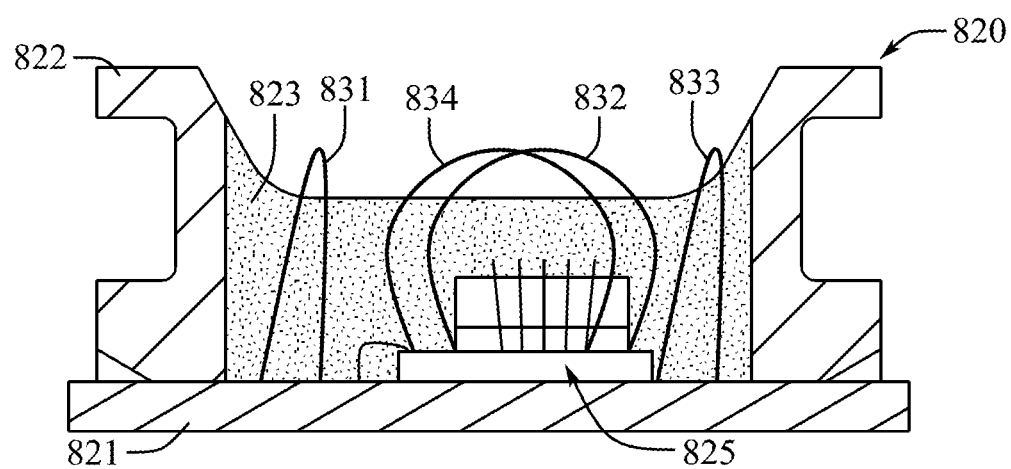
FIG. 15 shows a cross-sectional side view of a component of an electronic device.
Figure 16:
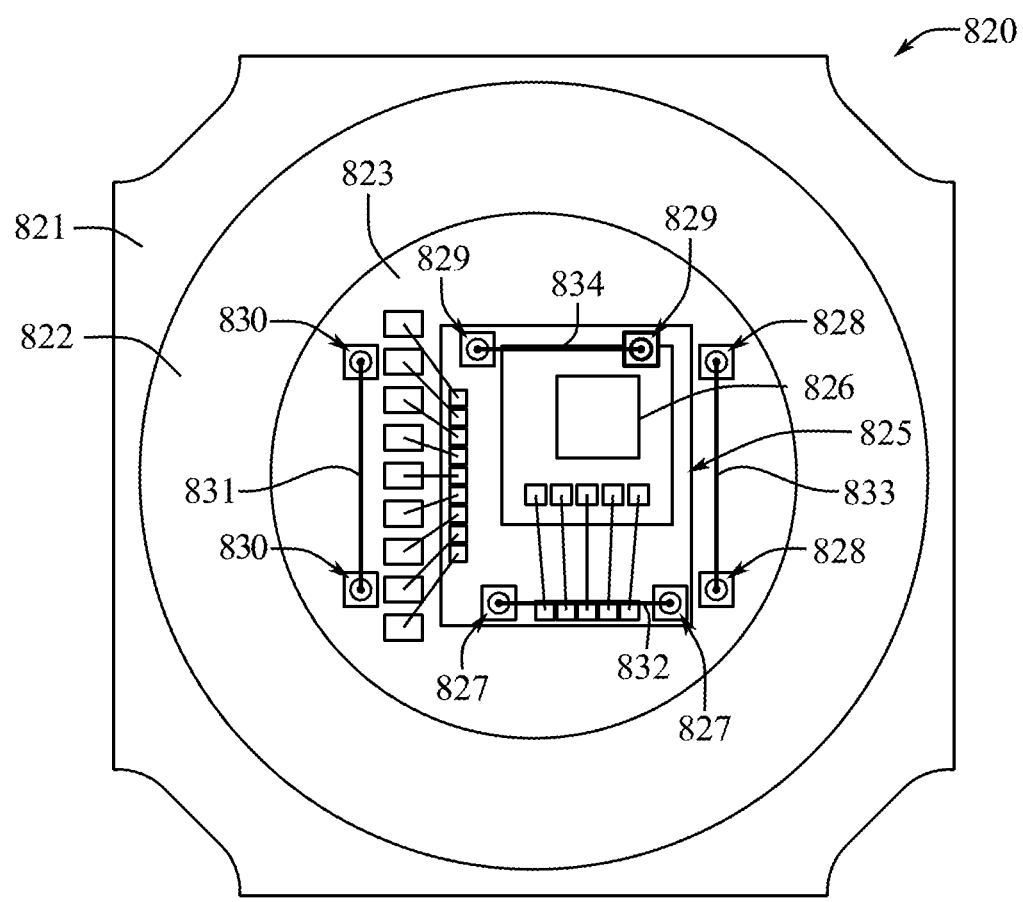
FIG. 16 shows a top view of a component of the electronic device of FIG. 15.

FIGS. 15 and 16 illustrate cross-sectional and top views of a pressure sensor 820. The pressure sensor 820 can be substantially similar to, and can include some or all of the features of, pressure sensors 129, 220, 320, 420, 520, 620, 720 described herein. In this example, the pressure sensor 820 can include a conductive structure 822 that is disposed on and affixed to a base 821. The structure 822 and the base 821 can at least partially enclose a sensor volume that is in communication with the ambient environment. In this example, the structure 822 can have a substantially cylindrical shape, but can also include one or more non-planar sidewalls. A sensor die 825 can be disposed on, or can be affixed to, the base 821 and can further be in electrical communication with one or more other components of the device, for example, through vias or wires embedded in or on part of the base 821.

The sensor die 825 can include a number of pads or electrical contacts and can include a pressure sensing component 826 disposed thereon or affixed thereto, for example, by soldering or another bonding method. A gel 823 is disposed in the sensor volume such that it surrounds the pressure sensing component 826. In this example, the pressure sensor 820 can include multiple exposed electrical conductors 831, 832, 833, 834 that can take any of the forms described herein, but in this example are shown as loops of conductive wire. Each of the exposed electrical conductors 831, 832, 833, 834 can be bonded to one or a pair of separate pads or electrical contacts 827, 828, 829, 830 and can thus be in electrical communication and form a circuit with the structure 822 as described herein.

For example, the exposed electrical conductor 834 can be a wire loop that includes a first ended bonded or affixed to a first contact pad 829 of a pair of pads on the die 825, and a second end bonded or affixed to a second contact pad 829 of the pair of pads on the die 825. The pairs of contact pads 827, 828, 829, 830 can be disposed at any number of desired locations within the sensor volume. For example, one or more pairs of pads 827, 828, 829, 830 can be disposed on the sensor die 825. In some examples, one or more pairs of pads 827, 828, 829, 830 can be disposed on the base 821. In some examples, one or more pairs of pads 827, 828, 829, 830 can be disposed on the base 821, while one or more other pairs of pads 827, 828, 829, 830 can be disposed on the sensor die 825.

In the illustrated example, two pairs of pads 827 and 829 can be disposed on the sensor die 825, while two other pairs of pads 828, 830 can be disposed on the base 821. The exposed electrical conductors 831, 832, 833, 834 can be bonded to the pairs of pads 827, 828, 829, 830 by any conventional wire bonding process, as described herein. Although illustrated as being arranged in an approximately rectangular pattern, the pairs of pads 827, 828, 829, 830 and exposed electrical conductors 831, 832, 833, 834 can be disposed at any desired location on the base 821, and in some examples, can be near or adjacent to the sensing component 826. As can be seen, the exposed electrical conductors 831, 832, 833, 834 are disposed entirely within the sensor volume, but can protrude above the gel 823 by any desired amount, such as by at least about 100 microns, at least about 200 microns, at least about 300 microns, at least about 400 microns, or at least about 500 microns. In some examples, the exposed electrical conductors 831, 832, 833, 834 can all protrude the same amount above the gel 823, or by different amounts. As with other examples described herein, the exposed electrical conductors 831, 832, 833, 834 can be electrically connected to, and can form a circuit with, the structure 822, for example, in series, in parallel, or combinations thereof, and can be used to detect the presence of a liquid at the pressure sensor 820, for example, as described with respect to FIG. 10.

In some embodiments, a pressure sensor can include any combination of any number of exposed electrical conductors, as described herein. In some examples, the one or more exposed electrical conductors can be disposed at any combination of the locations described herein, and/or can be disposed at any other desired location, as long as a circuit including the one or more exposed electrical conductors and a conductive portion of the structure has at least one electrical property that will detectably change when a liquid is present at or sufficiently near the pressure sensor to disrupt, impact, or influence the pressure value detected by the sensor. Various examples of components, assemblies, and devices including liquid sensing components as described herein, and processes for using and forming the same are described below with reference to FIGS. 17-18.

Figure 17:
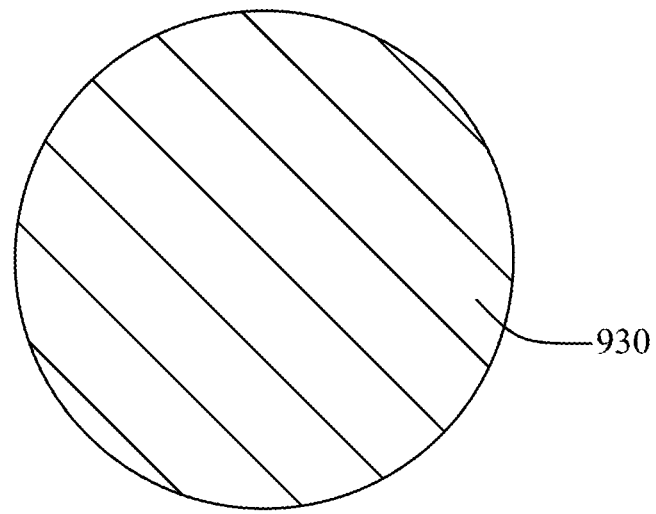
FIG. 17 shows a cross-sectional view of a component of an electronic device.

FIG. 17 shows a cross-sectional view of an embodiment of an exposed electrical conductor 930 of a pressure sensor, as described herein. The exposed electrical conductor 930 can include some or all of the features of any of the exposed electrical conductors described herein, and can further include any desired shape or configuration, including but not limited to a wire or loop, as described herein. In the present example, the exposed electrical conductor 930 includes, or is formed from, a metallic material, such as copper, gold, aluminum, and/or alloys thereof. In some examples, and as shown, the exposed electrical conductor 930 can be a substantially continuous or unitary component, and can be a wire or rod of the conductive material. Although shown as having a circular cross section, the exposed electrical conductor 930 can have any desired cross-sectional shape or combinations of shapes. In some examples, the diameter or width of exposed electrical conductor 930 can be relatively constant over its length. In other examples, however, the diameter or width of the exposed electrical conductor 930 can vary. An additional embodiment of the exposed electrical conductor 1030 is described below with reference to FIG. 18.

Figure 18:
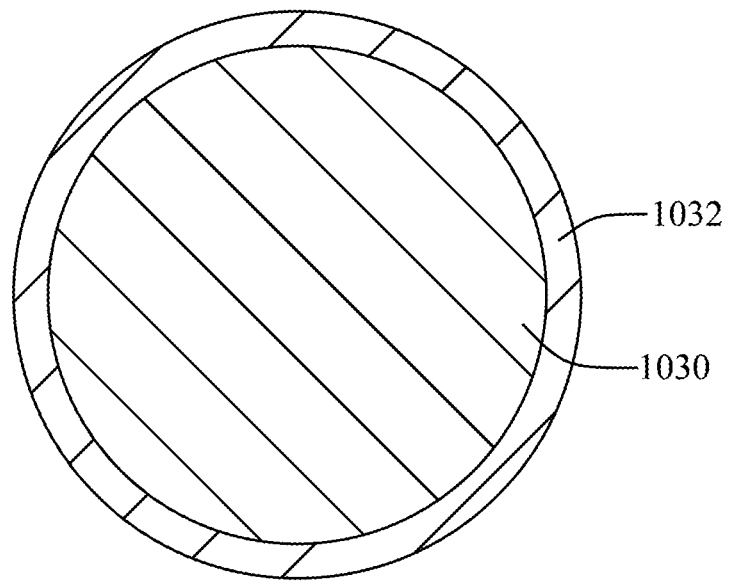
FIG. 18 shows a cross-sectional view of a component of an electronic device.

FIG. 18 shows a cross-sectional view of another embodiment of a coated electrical conductor 1030 of a pressure sensor, as described herein. The exposed electrical conductor 1030 can include some or all of the features of any of the exposed electrical conductors described herein, and can further include any desired shape or configuration, including but not limited to a wire or loop, as described herein. In the present example, the exposed electrical conductor 1030 includes or is formed from a metallic material, such as copper, gold, aluminum, and/or alloys thereof. As shown, in some examples, the exposed electrical conductor 1030 can further include a shell or a coating 1032 that can at least partially surround the exposed electrical conductor 1030. In some examples, the coating 1032 can entirely surround the exposed electrical conductor 1030. In some examples, the coating 1032 only surrounds select or desired portions of the exposed electrical conductor 1030. For example, the coating 1032 can surround only the portion of the exposed electrical conductor 1030 that is not surrounded by the gel of the pressure sensor.

As at least a portion of the exposed electrical conductor 1030 can be exposed to or can be in communication with the ambient environment, as described herein. In some examples, the coating 1032 can serve to protect the exposed electrical conductor 1030 from potential environmental causes of corrosion, without unduly limited the ability of the exposed electrical conductor 1030 to detect the presence of a liquid, as described herein.

In some embodiments where the exposed electrical conductor 1030 is a gold wire, the exposed electrical conductor 1030 can experience undesirable corrosion when exposed to environmental chlorine. Such exposure can occur, for example, if the electronic device including the pressure sensor with exposed electrical conductor 1030 is in an environment such as a swimming pool that includes chlorinated water. If subjected to prolonged exposure to such an environment, an exposed electrical conductor 1030 including an uncoated gold wire can experience corrosion that can undesirably degrade the ability to detect the presence of liquid, as described herein. Accordingly, the exposed electrical conductor 1030 can be coated with a material that can prevent or reduce the corrosion caused by environmental agents, such as chlorine. Various examples of components, assemblies, and devices including liquid sensing components as described herein, and processes for using and forming the same are described below with reference to FIGS. 19-24.

Figure 19:
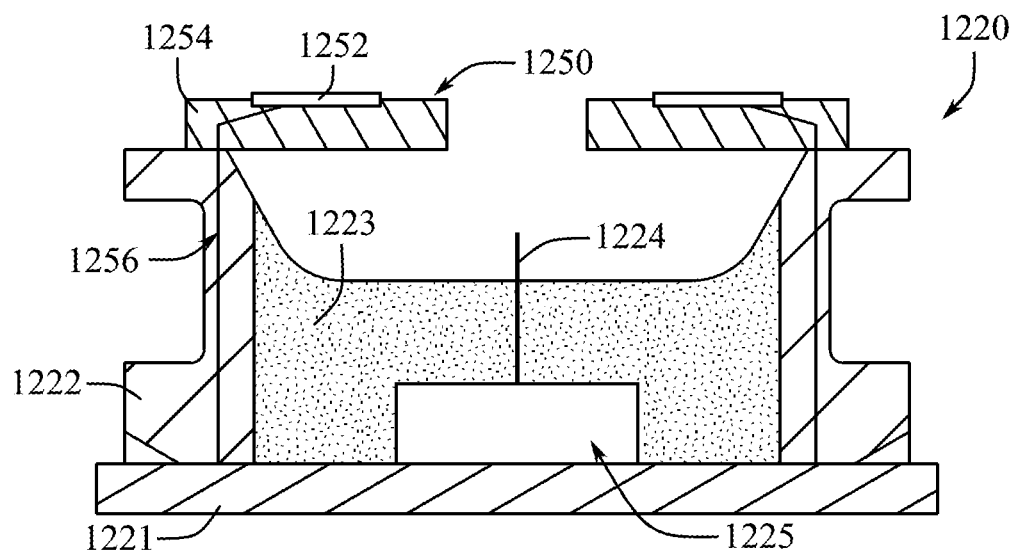
FIG. 19 shows a cross-sectional side view of a component of an electronic device.

FIG. 19 shows a cross-sectional side view of an embodiment of a pressure sensor 1220 that can be included in an electronic device and used in any of the methods described herein. The pressure sensor 1220 can be substantially similar to, and can include some or all of the features of, pressure sensors 129, 220, 320, 420, 520, 620, 720, 820 described herein. In some embodiments, the pressure sensor 1220 can include all of the features of the pressure sensor 520 described with respect to FIG. 9, such as a structure 1222 that includes a conductive material and is disposed on and affixed to a base 1221. The structure 1222 and the base 1221 at least partially enclose a sensor volume, and a protective gel 1223 is disposed therein. A pressure sensing component 1225 is also disposed in the sensor volume and is both surrounded by the gel 1223 and affixed to the base 1221. An exposed electrical conductor 1224 can be disposed directly on the pressure sensing component 1225 and can at least partially protrude above the gel 1223.

As described herein, for example, with respect to FIG. 11, when the presence of liquid is detected at the pressure sensor 1220, the detection can trigger a remedial action by the pressure sensor assembly and/or other components of the electronic device. In some examples, the remedial action can include discounting or modifying any signals generated or transmitted by the pressure sensor 1220. In some examples, however, the remedial action can include a process or processes configured to remove or reduce the amount of liquid at the pressure sensor 1220. In the present example illustrated in FIG. 19, the pressure sensor 1220 includes one or more heaters 1250 that can be activated to cause evaporation of any liquid that can is detected and might be in contact with, or be adjacent to, the heaters 1250, thereby clearing the pressure sensor 1220 of undesirable liquid. In some examples, a heater 1250 can reach a desired temperature, or produce a sufficient amount of heat to boil any liquid present at the sensor 1220. In some examples, the heater 1250 can reach a desired temperature, or produce a sufficient amount of heat to increase a rate of evaporation of any liquid by a desired amount.

A resistive heater 1250 can be disposed at any desired location on the pressure sensor 1220, for example, at a location at or near an anticipated location of an undesirable liquid. Accordingly, in some examples, the heater 1250 can be disposed on a top surface of the structure 1222. The heater 1250 can include a heating element 1252 that in some examples can be a resistive heater 1252. The heater 1252 can include a material that can be heated to a desired temperature, for example, near or above a boiling point of a liquid, such as water, when supplied with a desired level of electrical current or power. Thus, the heating element 1252 can include a conductive material, such as metallic material. Further, the heating element 1252 can be at least partially exposed to the ambient environment.

The heater 1250 can further include an electrical connector 1254 that can connect the heating element 1252 to one or more other components of the pressure sensor 1220 or device, and can supply electrical power to the heater 1252. In some examples, the electrical connector 1254 can be a wire and can be connected to the base 1221 and/or to one or more other components, such as processors and batteries of the device. In some examples, the wire 1254 can be disposed on the structure 1222 or can pass through an aperture 1256 or other portion of the structure 1222. In some examples, the structure 1222 itself can act as an electrical connector between the heating element 1252 and other components of the device. In some examples, the structure 1222 can further act as all or a portion of the heating element 1252. Additional pressure sensor configurations are discussed below with reference to FIGS. 20 and 21.

Figure 20:
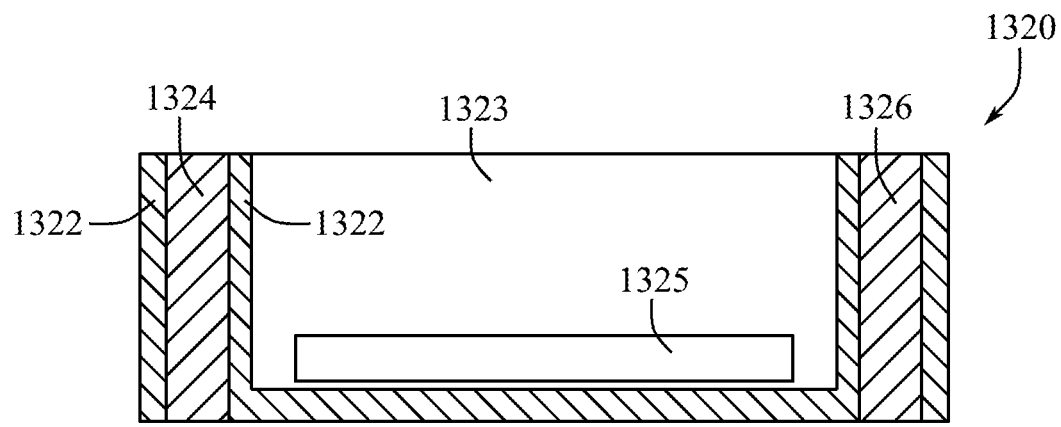
FIG. 20 shows a cross-sectional side view of a component of an electronic device.
Figure 21:
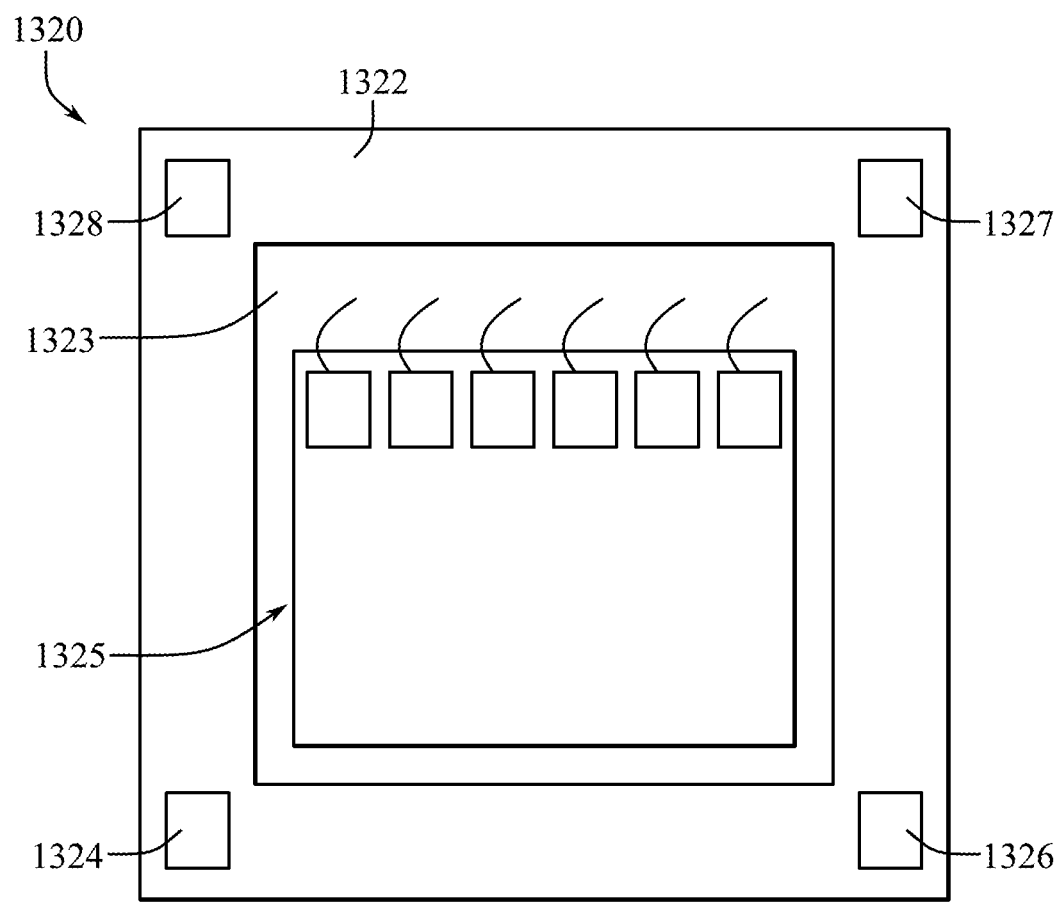
FIG. 21 shows a top view of the electronic component of FIG. 20.

FIG. 20 shows a cross-sectional view of another embodiment of a pressure sensor 1320, while FIG. 21 illustrates a top view of the pressure sensor 1320. The pressure sensor 1320 can be substantially similar to, and can include some or all of the features of, pressure sensors 129, 220, 320, 420, 520, 620, 720, 820, 1220 described herein. In this example, the pressure sensor 1320 can include a structure 1322 that can at least partially enclose a sensor volume. In some examples, the structure 1322 can include a base and sidewalls, and can define an open top or aperture. In some other examples, the structure 1322 can be coupled to a base to at least partially enclose a sensor volume, for example, as described with respect to at least FIGS. 6-16. As with the pressure sensors described herein, the pressure sensor 1320 can include a pressure sensing component 1325 disposed in the sensor volume and a gel 1323 that can surround the sensing component 1325, and that can partially or entirely occupy the sensor volume.

Whereas some embodiments described herein can include a structure formed of a conductive material, in the present example, the structure 1322 can include an insulating or non-conductive material, such as a ceramic or polymeric material. The structure 1322 including a non-conductive material can further include one or more portions of conductive material 1324, 1326, 1327, 1328. These portions of conductive material 1324, 1326, 1327, 1328 can be at least partially exposed to the ambient environment at one or more desired locations on the structure 1322, such as a top surface and/or a location where the presence of an undesirable liquid is anticipated. The exposed portions of conductive material 1324, 1326, 1327, 1328 can serve the same function as the exposed electrical conductors described herein, for example, with respect to at least FIGS. 6-16.

In some examples, the exposed conductive portions of the structure 1324, 1326, 1327, 1328 can be integrally formed with the non-conductive portion of the structure 1322. In some examples, one or more of the exposed conductive portions 1324, 1326, 1327, 1328 can be disposed in an aperture or apertures defined by the structure 1322. In some examples, the exposed conductive portions 1324, 1326, 1327, 1328 can include a metal, such as gold, copper, aluminum, and/or alloys thereof. The exposed conductive portions 1324, 1326, 1327, 1328 can be part of, or can form a circuit having one or more electrical properties, such as a capacitance, resistance, and/or inductance that can be detectably changed if a liquid contacts or is disposed sufficiently adjacent to the exposed conductive portions 1324, 1326, 1327, 1328. Additional sensor configurations are detailed below with reference to FIG. 22.

Figure 22:
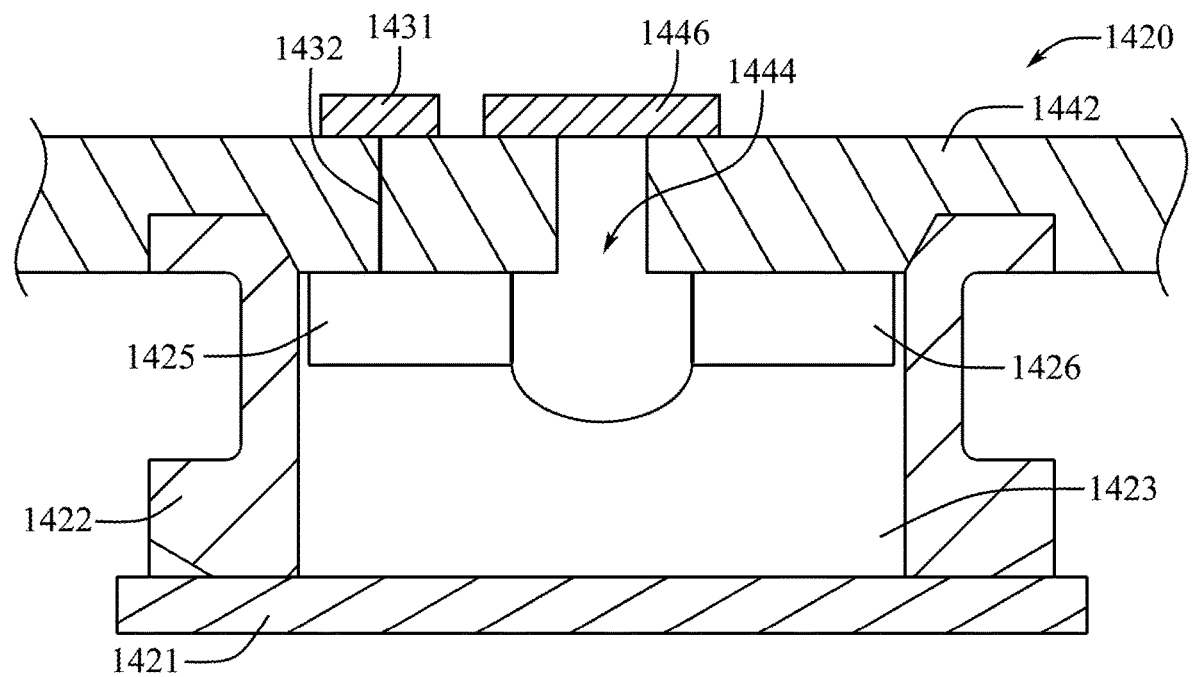
FIG. 22 shows a cross-sectional side view of a component of an electronic device.

FIG. 22 shows a cross-sectional view of another embodiment of a pressure sensor 1420. The pressure sensor 1420 can be substantially similar to, and can include some or all of the features of, pressure sensors 129, 220, 320, 420, 520, 620, 720, 820, 1220, 1320 described herein. In this example, the pressure sensor 1420 includes a structure 1422 that can be coupled to a base 1421 to partially define a sensor volume 1423. A first pressure sensing component 1425 and a second pressure sensing component 1426 can be disposed in the sensor volume 1423. A lid 1442 can cover and further define the sensor volume 1423, while also defining an aperture 1444 through which the sensor volume 1423 can communicate with the ambient environment. Whereas some examples of pressure sensors can include a gel to provide waterproofing, in this example an air permeable and liquid impermeable membrane 1446 can cover or occlude the aperture 1444. Such a design can still be susceptible to similar issues as the other pressure sensors described herein when a liquid, such as water, is located on the membrane 1446.

Accordingly, the pressure sensor 1420 can include an exposed conductor 1431 that can be in the form of a wire, or pad of conductive material disposed on the lid 1442. In some examples, the lid can be a non-conductive material, such as a polymer or ceramic material. The exposed electrical conductor 1431 can be electrically connected to one or more other components, such as the structure or the base 1421, via a conductor 1432, and can form a circuit as described herein to detect the presence of liquid. An additional sensor configuration is provided below with reference to FIG. 23.

Figure 23:
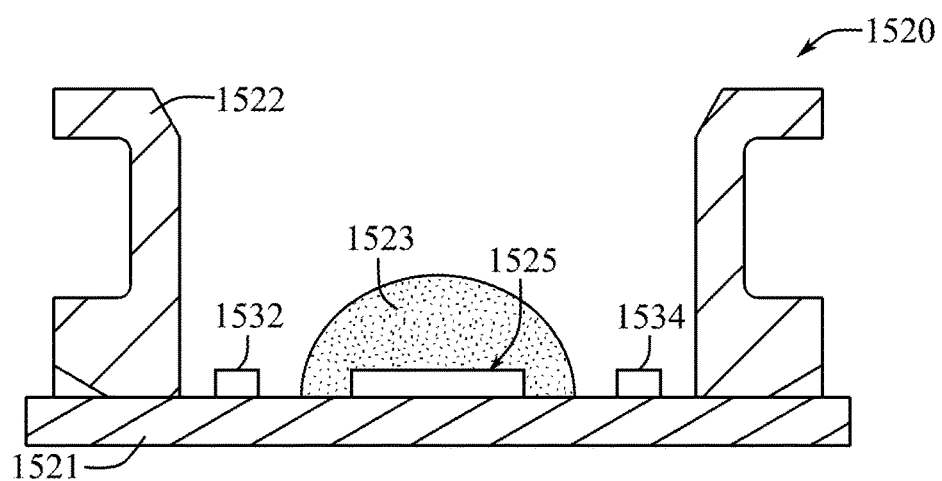
FIG. 23 shows a cross-sectional side view of a component of an electronic device.

FIG. 23 shows a cross-sectional view of another embodiment of a pressure sensor 1520. The pressure sensor 1520 can be substantially similar to, and can include some or all of the features of, pressure sensors 129, 220, 320, 420, 520, 620, 720, 820, 1220, 1320, 1420 described herein. In this example, the pressure sensor 1520 can include a structure 1522 that is disposed on and affixed to a base 1521. The structure 1522 can include any form of conductive material, such as a metallic material, as described herein. The base 1521, meanwhile, can include a printed circuit board or ceramic substrate. The structure 1522 and the base 1521 can at least partially enclose a sensor volume that is in communication with the ambient environment.

A component, such as sensor die and/or a pressure sensing component 1525 can be disposed on or can be affixed to the base 1521 and can further be in electrical communication with one or more other components of the device, for example, through vias or wires embedded in or coupled to a part of the base 1521. In this example, exposed electrical conductors 1532, 1534 can be disposed on or can be affixed to the base 1521, for example, at locations within the sensor volume that are adjacent to the sensing component 1525. In this example, the exposed electrical conductors 1532, 1534 can be any desired shape, and can be disposed entirely within the sensor volume. Whereas some examples of pressure sensors described herein can include a gel disposed in the sensor volume that at least partially surrounds both the sensing component and one or more exposed electrical conductors, in some examples and as shown, the pressure sensor 1520 can include a gel 1523 that surrounds the sensing component 1525 but that does not contact the exposed electrical conductors 1532, 1534. An additional sensor configuration is described below with reference to FIG. 24.

Figure 24:
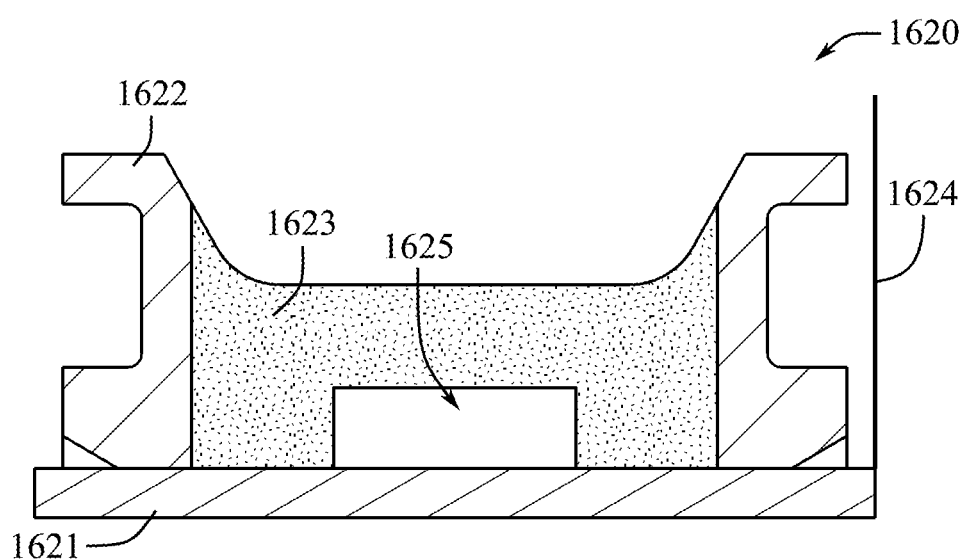
FIG. 24 shows a cross-sectional side view of a component of an electronic device.

FIG. 24 shows a cross-sectional view of another embodiment of a pressure sensor 1620. The pressure sensor 1620 can be substantially similar to, and can include some or all of the features of, pressure sensors 129, 220, 320, 420, 520, 620, 720, 820, 1220, 1320, 1420, 1520 described herein. In this example, the pressure sensor 1620 can include a structure 1622 that is disposed on and affixed to a base 1621. The structure 1622 can include any form of conductive material, such as a metallic material, as described herein. The base 1621, meanwhile, can include a printed circuit board or a ceramic substrate, as described herein. The structure 1622 and the base 1621 can at least partially enclose a sensor volume that is in communication with the ambient environment. A component, such as a sensor die and/or a pressure sensing component 1625 can be disposed on or can be affixed to the base 1621, and can further be in electrical communication with one or more other components of the device, for example, through vias or wires embedded in or on part of the base 1621. A gel 1623 can be disposed in the sensor volume to surround the sensing component 1625.

Whereas some examples of pressure sensors described herein can include one or more exposed electrical conductors that are at least partially disposed in the sensor volume and are connected to the base 1621, in some examples, an exposed electrical conductor 1624 can be disposed outside the sensor volume, for example, adjacent to the structure 1622. In some examples, the exposed electrical conductor 1624 can nevertheless be bonded or otherwise affixed to the base 1621, although in some examples the exposed electrical conductor 1624 can be disposed or affixed to other locations or components. As with the other exposed electrical conductors described herein, the exposed electrical conductor 1624 can form a circuit with the structure 1622 that has one or more electrical properties which can detectably change when the circuit is contacted by or sufficiently close to a liquid, as described herein. Various examples of processes for using and forming the same are described below with reference to FIG. 25.

Figure 25:
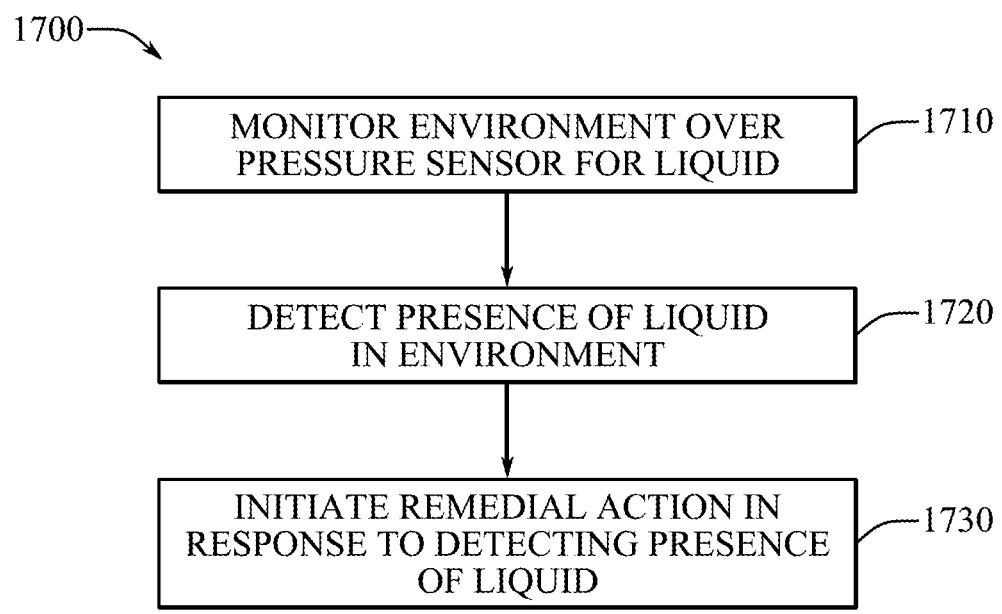
FIG. 25 shows a process flow diagram for a method of sensing a liquid at a pressure sensor assembly.

FIG. 25 shows a process flow diagram for a method 1700 of sensing a liquid at a pressure sensor assembly. The method 1700 can include monitoring an environment over a pressure sensor for the presence of a liquid at block 1710, detecting the presence of the liquid in the environment at block 1720, and initiating, at block 1730, a remedial action in response to detecting the presence of the liquid.

At block 1710, the electronic device, a component thereof, such as a processor, and/or a component of a pressure sensor assembly, such as a processor or microprocessor can monitor an environment at, near, over, or adjacent to the pressure sensor for the presence of a liquid. In some examples, the environment can be an area that has an exposed electrical conductor of the pressure sensor at least partially disposed therein, for example, as described herein. In some examples, the environment can be an environment directly overlying the pressure sensor and can include some or all of the sensor volume, as described herein. In some examples, the environment can be any region of space at or near the pressure sensor in which the presence of a liquid would undesirably affect the pressure sensor.

In some examples, monitoring can include monitoring one or more electrical properties of a circuit including the exposed electrical conductor, as described herein. For example, monitoring can include monitoring one or more of the capacitance, resistance, inductance, or other property of the circuit including the exposed electrical conductor, as described herein. In some examples, monitoring can include continuously or substantially continuously sampling, measuring, or reading values for one or more the electrical properties of the circuit, such as with a process that is electrically connected to the circuit. In some examples, monitoring can include sampling, measuring, or reading values for one or more the electrical properties of the circuit at a desired time interval or intervals.

At block 1720, the presence of any liquid in the environment can be detected by the pressure sensor assembly. In some examples, an amount of liquid in the environment must be greater than a threshold amount of liquid for a detection to occur. Accordingly, the step of detecting the liquid at block 1720 will not occur unless a liquid, for example, in an undesirable amount, is present in the environment. As described herein, detecting the presence of the liquid can include detecting a predetermined change in one or more of the electrical properties of the circuit including the exposed electrical conductor in excess of a threshold. In some examples, the circuit can also include a structure at least partially enclosing a volume around a pressure sensing component as described here.

Thus, in some examples, detecting can include detecting a change in one or more of the resistance, capacitance, and/or inductance of the circuit including the exposed electrical conductor. The detecting can be performed or accomplished by any or all of the components involved in the monitoring described with respect to block 1710. In some examples, the detecting can include sampling, measuring, or reading one or more of the electrical properties of the circuit, and determining when a measured value differs by more than a desire amount from a reference value or a value read at a previous time.

In some examples, when no liquid is present in the environment, a resistance value of the circuit can be on the order of gigaohms or greater, and in some instances can be measured or considered as effectively infinite. In some examples, when a liquid is present in the environment a resistance value of the circuit can be between about 0.1 megaohms to about 10 megaohms, for example, about 1, 2, 3, 4, 5, 6, or 7 megaohms. In some examples, when no liquid is present in the environment a capacitance value of the circuit measured at a frequency of about 100 hertz can be on the order of picofarads. In some examples, the capacitance value at 100 hertz when no liquid is present can be between about 1 picofarad and about 100 picofarads, such as about 25 picofarads. When a liquid is present in the environment, the capacitance value at 100 hertz can be on the order of nanofarads, for example, between about 1 nanofarad and about 100 nanofarads. In some examples, when no liquid is present in the environment an inductance value of the circuit can be measured as effectively zero microamperes. When a liquid is present in the environment an inductance value of the circuit can be between about 0.1 and about 2 microamperes, for example, about 0.5 microamperes.

In some examples, detecting the presence of a liquid at block 1720 can further include detecting an amount and/or type of liquid present in the environment. That is, by detecting the amount or type of change in one or more of the electrical properties of the circuit, not only can the presence of a liquid be detected, but the magnitude of the change in the electrical properties can also be used to determine the amount of liquid present, and/or the type of liquid. For example, the presence of non-salinated water, such as tap water, can produce a first change in one or more electrical properties of the circuit, while the presence of salinated water, such as sea water, can produce a second change of a different magnitude or type than the first change.

At block 1730, a remedial action can be initiated based on or in response to detecting the presence of a liquid at block 1720. As described herein, in some examples, the remedial action can include one or more of turning on a heating element, modifying a signal produced by the pressure sensor assembly, and/or disregarding a signal produced by the pressure sensor assembly. In some examples, the remedial action can include notifying a user of the detection, turning on a speaker or vibrating element, such as a haptic actuator, to remove the liquid from the environment, and/or determining an air pressure with a different component of the device, such as by another pressure sensor, or by querying a database including local air pressure information based on GPS coordinates of the device.

In some examples, while the remedial action can be carried out by one or more components of the device or pressure sensor assembly, such as a heater, the initiating can be performed or directed by a processor of the device and/or sensor assembly, for example, the same processor involved with the monitoring and/or detecting at block 1710, 1720.

In some examples, where the presence of the liquid in the environment can result in a regular or predictable change in the air pressure values determined by the air pressure sensor, the remedial action can include modifying the signal from the air pressure sensor by a given, known, or desired amount to produce an accurate air pressure reading. For example, the error associated with an air pressure reading can be proportional or related to an amount of liquid present in the environment, with more liquid producing a greater error. In such an example, the signal from the air pressure sensor can be modified based on the detection of the presence and the amount of the liquid in the environment.

Any of the features or aspects of the components discussed herein can be combined or included in any varied combination. For example, the design and shape of the pressure sensor assembly is not limited in any way and can be formed by any number of processes, including those discussed herein. Further, the pressure sensor assembly can monitor and detect the presence of liquid at or near the pressure sensor assembly by any method now known or discovered in the future. The principles and structure described with respect to detecting the presence of liquid can also be used in conjunction with other sensing components and/or assemblies and are not limited to being applicable to pressure sensors.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including;" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    a housing defining an internal volume;
    a pressure sensor assembly disposed in the internal volume and in communication with an ambient environment, the pressure sensor assembly comprising:
        a structure at least partially enclosing a sensor volume;
        a pressure sensor affixed to a die disposed in the sensor volume; and
        an exposed moisture detection conductor positioned inside the sensor volume and exposed to the ambient environment.

2. The electronic device of claim 1, further comprising a processor connected to the exposed moisture detection conductor, the processor detecting a change in at least one of a resistance, a capacitance, or an inductance of a circuit including the exposed moisture detection conductor.

3. The electronic device of claim 1, further comprising an array of exposed moisture detection conductors positioned in the sensor volume.

4. The electronic device of claim 1, wherein the exposed moisture detection conductor comprises a wire loop.

5. The electronic device of claim 1, wherein the exposed moisture detection conductor is bonded to a pad of the die.

6. A pressure sensor assembly, comprising:
    a structure at least partially enclosing a sensor volume;
    a pressure sensor affixed to a die disposed in the sensor volume; and
    an exposed moisture detection conductor positioned inside the sensor volume and exposed to an environment outside the sensor volume.

7. The pressure sensor assembly of claim 6, wherein the pressure sensor assembly detects the presence of a liquid in the sensor volume by detecting a change in a resistance of a circuit including the exposed moisture detection conductor.

8. The pressure sensor assembly of claim 6, wherein pressure sensor assembly detects the presence of the liquid by detecting a change in at least one of a capacitance or an inductance of a circuit including the exposed moisture detection conductor.

9. The pressure sensor assembly of claim 6, further comprising an array of exposed moisture detection conductors positioned in the sensor volume.

10. The pressure sensor assembly of claim 6, wherein the exposed moisture detection conductor comprises a wire loop.

11. The pressure sensor assembly of claim 6, further comprising a gel at least partially occupying the sensor volume.

12. The pressure sensor assembly of claim 11, wherein the exposed moisture detection conductor is at least partially disposed in the gel and protrudes from the gel by at least 100 microns.

13. The pressure sensor assembly of claim 6, wherein:
the structure comprises a wall of conductive material at least partially surrounding the sensor volume; and
the exposed electrical conductor and the wall are electrically connected.

14. The pressure sensor assembly of claim 6, wherein the structure comprises:
a ceramic material at least partially surrounding the sensor volume; and
a conductive contact electrically connected to the exposed electrical conductor.

15. The pressure sensor assembly of claim 6, wherein the exposed electrical conductor comprises a metallic wire coated with a corrosion resistant material.

* * * * *